(12) United States Patent
Matsumoto

(10) Patent No.: US 10,423,705 B2
(45) Date of Patent: Sep. 24, 2019

(54) DOCUMENT MANAGEMENT PROGRAM FOR EXECUTING ON A WEB BROWSER FOR UPLOADING DOCUMENTS TO A DOCUMENT MANAGEMENT SERVER

(75) Inventor: Yoshitaka Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 14/009,058

(22) PCT Filed: May 14, 2012

(86) PCT No.: PCT/JP2012/003129
§ 371 (c)(1),
(2), (4) Date: Sep. 30, 2013

(87) PCT Pub. No.: WO2012/160772
PCT Pub. Date: Nov. 29, 2012

(65) Prior Publication Data
US 2014/0317490 A1 Oct. 23, 2014

(30) Foreign Application Priority Data
May 20, 2011 (JP) ................................. 2011-113827

(51) Int. Cl.
*G06F 17/22* (2006.01)
*G06F 16/13* (2019.01)
(Continued)

(52) U.S. Cl.
CPC ........ *G06F 17/2247* (2013.01); *G06F 3/0481* (2013.01); *G06F 3/0486* (2013.01);
(Continued)

(58) Field of Classification Search
CPC ....... G06F 17/22; G06F 17/2247; G06F 16/16
See application file for complete search history.

(56) References Cited

U.S. PATENT DOCUMENTS 5,668,966 A * 9/1997 Ono ................... G06F 17/30398
715/835
6,016,146 A * 1/2000 Beer ..................... G06F 9/4443
715/825

(Continued)

FOREIGN PATENT DOCUMENTS

JP 2004-240539 A 8/2004
JP 2005-505057 A 2/2005
(Continued)

OTHER PUBLICATIONS

Jun. 24, 2010, Dropbox Quick Start (Dropbox-Quick-Start_final.pdf), Indian Institute of Technology Guwahati, 1-5.*
(Continued)

*Primary Examiner* — Asher D Kells
(74) *Attorney, Agent, or Firm* — Canon U.S.A., Inc. IP Division

(57) ABSTRACT

Users can upload files (or folders) managed by a file system of an operating system or the like to a desired folder included in a hierarchical folder structure displayed by a rich Internet application executed on a web browser, by executing a drag and drop operation. A first extended program displays a hierarchical folder structure managed by a document management server in a display area on the web browser, determines whether a pointing device overlaps with any folder displayed on the web browser based on mouse event information set by the web browser, and sets information about the folder overlapping with the pointing device in the web browser. The web browser stores folder information in a bridge data storage unit. A second extended program, operating on a web browser, uploads the file to the folder identified by the folder information stored in the bridge data storage unit.

10 Claims, 17 Drawing Sheets

(51) Int. Cl.

| | | |
|---|---|---|
| G06F 3/0486 | (2013.01) | |
| G06F 3/0481 | (2013.01) | |
| H04L 29/06 | (2006.01) | |
| G06F 16/16 | (2019.01) | |

(52) U.S. Cl.
CPC .............. G06F 16/13 (2019.01); G06F 16/16 (2019.01); H04L 67/42 (2013.01)

(56) References Cited

U.S. PATENT DOCUMENTS

| | | | | |
|---|---|---|---|---|
| 7,272,603 | B2* | 9/2007 | Fujita | G06F 17/30899 707/788 |
| 8,200,720 | B2* | 6/2012 | Harada | G06F 3/0486 345/625 |
| 2001/0028363 | A1* | 10/2001 | Nomoto | G06F 17/30067 715/748 |
| 2003/0066032 | A1* | 4/2003 | Ramachandran | G06F 3/04847 715/234 |
| 2004/0030719 | A1* | 2/2004 | Wei | G06F 17/30905 |
| 2004/0098379 | A1* | 5/2004 | Huang | G06F 17/30256 |
| 2004/0190057 | A1* | 9/2004 | Takahashi | G06F 3/1205 358/1.15 |
| 2005/0131959 | A1* | 6/2005 | Thorman | G06F 17/30126 |
| 2005/0177796 | A1* | 8/2005 | Takahashi | G06F 3/0486 715/769 |
| 2005/0182786 | A1* | 8/2005 | Suzuki | G06F 17/3089 |
| 2006/0044607 | A1* | 3/2006 | Kato | G06F 3/1222 358/1.15 |
| 2006/0070007 | A1* | 3/2006 | Cummins | G06F 17/30398 715/769 |
| 2006/0184540 | A1* | 8/2006 | Kung | G06F 17/3089 |
| 2007/0226734 | A1* | 9/2007 | Lin | G06F 9/44526 717/177 |
| 2007/0244921 | A1* | 10/2007 | Blair | G06F 17/30011 |
| 2009/0113330 | A1* | 4/2009 | Garrison | G06F 3/0486 715/769 |
| 2009/0228819 | A1* | 9/2009 | McDermott | G06F 3/0486 715/769 |
| 2010/0269056 | A1* | 10/2010 | Fujita | G06F 3/0486 715/760 |
| 2011/0016418 | A1* | 1/2011 | Fujita | G06F 3/0486 715/769 |
| 2011/0320508 | A1* | 12/2011 | Naito | G06F 17/3012 707/827 |
| 2012/0124068 | A1* | 5/2012 | Toyama | G06F 17/30011 707/758 |
| 2012/0233205 | A1* | 9/2012 | McDermott | G06F 17/30011 707/769 |
| 2013/0198143 | A1* | 8/2013 | Matsumoto | G06F 17/30902 707/661 |
| 2013/0212432 | A1* | 8/2013 | Guthrie | G06F 11/0709 714/16 |

FOREIGN PATENT DOCUMENTS

| | | | |
|---|---|---|---|
| JP | 2005-267614 A | 9/2005 | |
| JP | 2006-099741 A | 4/2006 | |
| JP | 2011-253497 A | 12/2011 | |
| RU | 2008135708 A | 3/2010 | |
| WO | 00/73957 A2 | 12/2000 | |
| WO | WO 2007097526 A1 * | 8/2007 | .......... G06F 3/0482 |
| WO | 2008/029774 A1 | 3/2008 | |

OTHER PUBLICATIONS

Jarel Remick, Oct. 31, 2010, The Ultimate Dropbox Toolkit & Guide (The Ultimate Dropbox Toolkit & Guide.pdf), appstorm.net, 1-51.*

Matt Smith, Nov. 21, 2010, The Unofficial Guide to Dropbox (The Unofficial Guide to Dropbox.pdf), makeuseof.com, 1-23.*

John Brunswick, Oracle "DropBox" with UCM, WebCenter and HTML5, Apr. 26, 2011, https://www.youtube.com/watch?v=bGBBqzRSsOU (oracle.pdf) (Year: 2011).*

CanvasLMS, Drag and Drop—Instructure Canvas Feature Highlight, Feb. 2, 2011, https://www.youtube.com/watch?v=LhcceilR0Mo (canvas.pdf) (Year: 2011).*

How to Accept Drag-and-Drop Files from Windows Explorer, Oct. 13, 2009, https://www.experts-exchange.com/articles/1737/How-to-Accept-Drag-and-Drop-Files-from-Windows-Explorer.html (Expert.pdf) (Year: 2009).*

A library of DHTML and AJAX scripts, Feb. 7, 2009, https://web.archive.org/web/20090207184224/http://www.dhtmlgoodies.com/scripts/drag-drop-folder-tree/drag-drop-folder-tree.html (dhtml.pdf), p. 1 (Year: 2009).*

"Close up, HTML5 no Shogeki, Web ha Application Kiban ni." Nikkei Computer 759 (Jun. 23, 2010): 66-73.

* cited by examiner

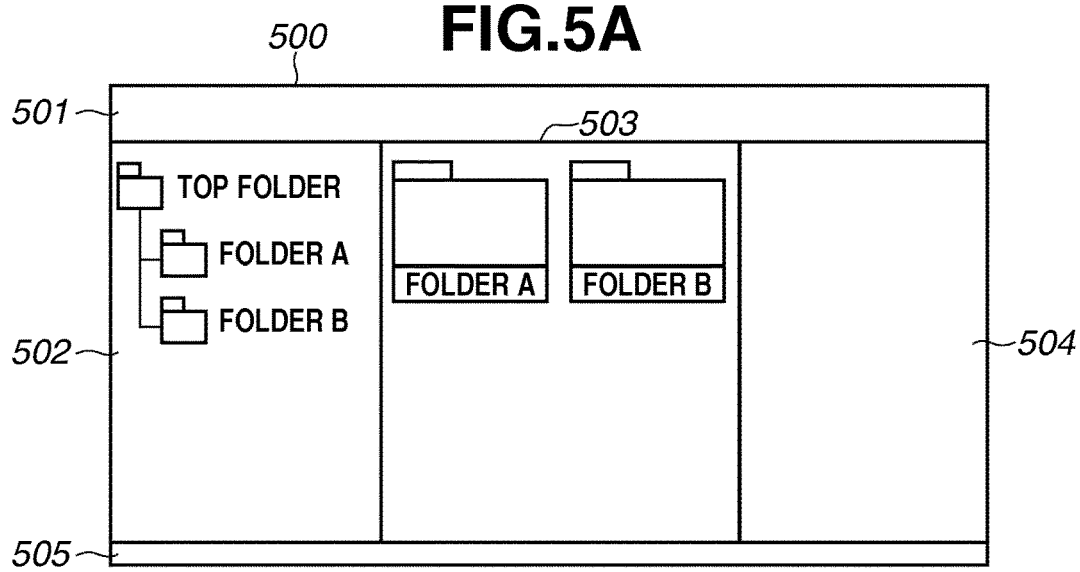
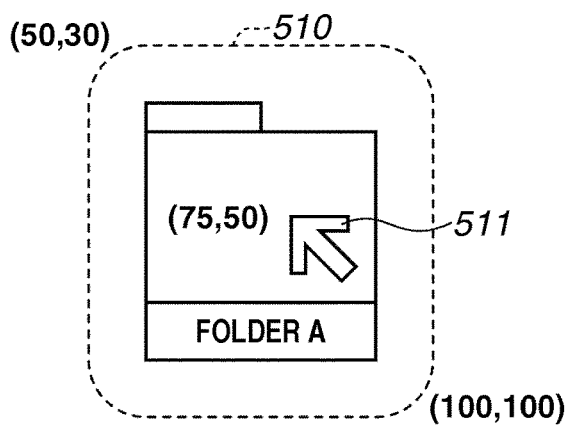
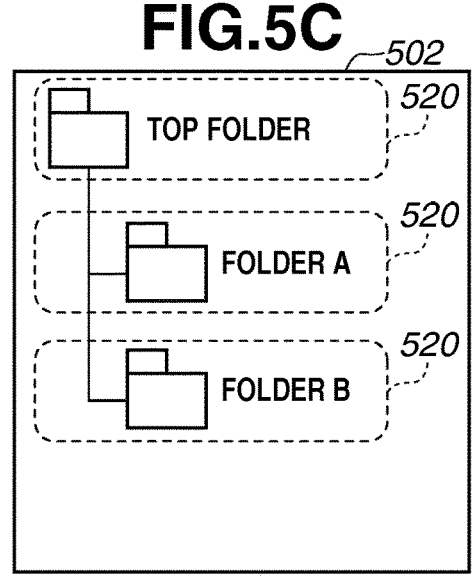
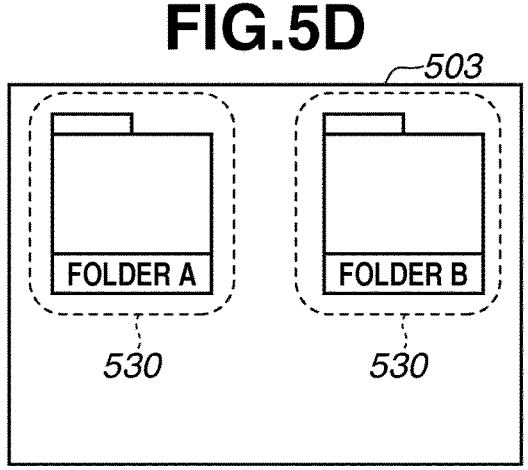
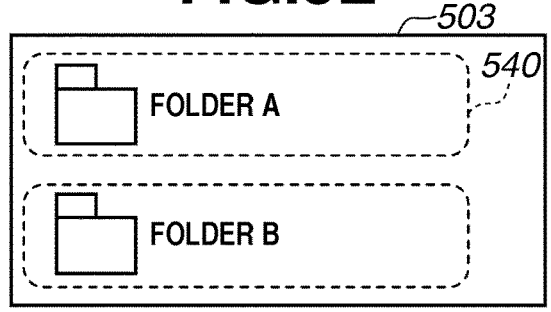

FIG.6A
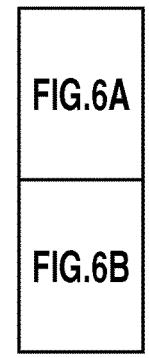
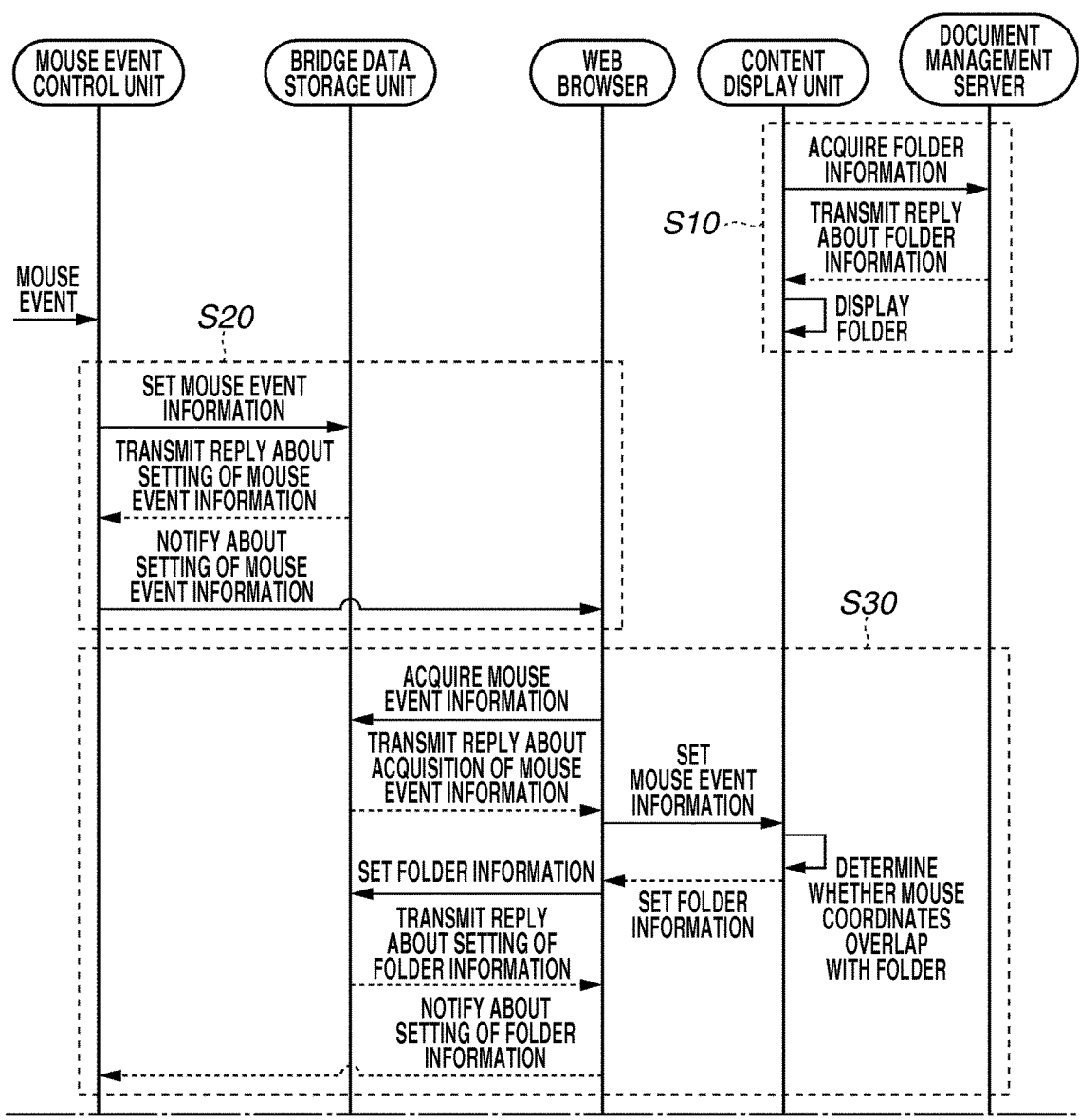

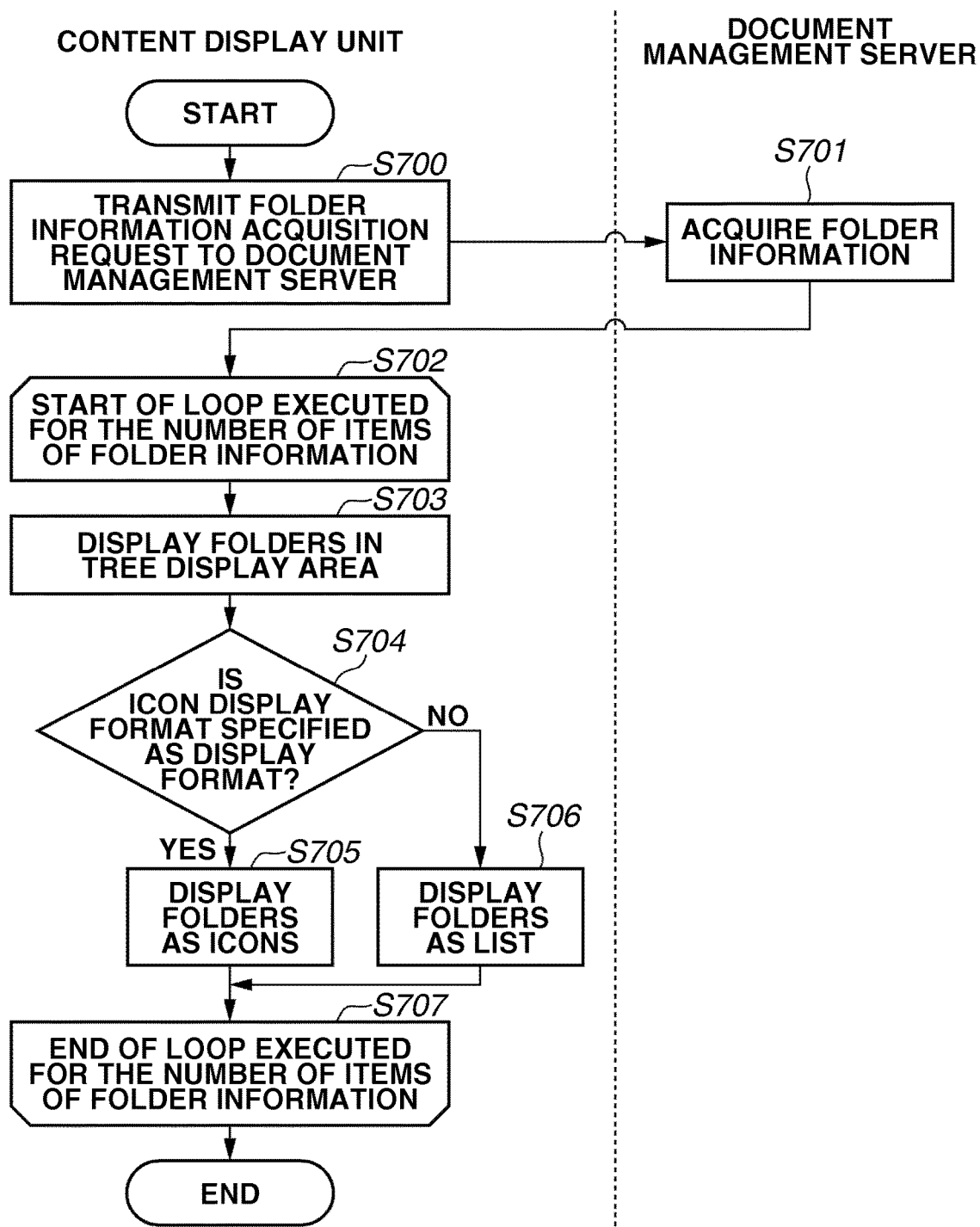

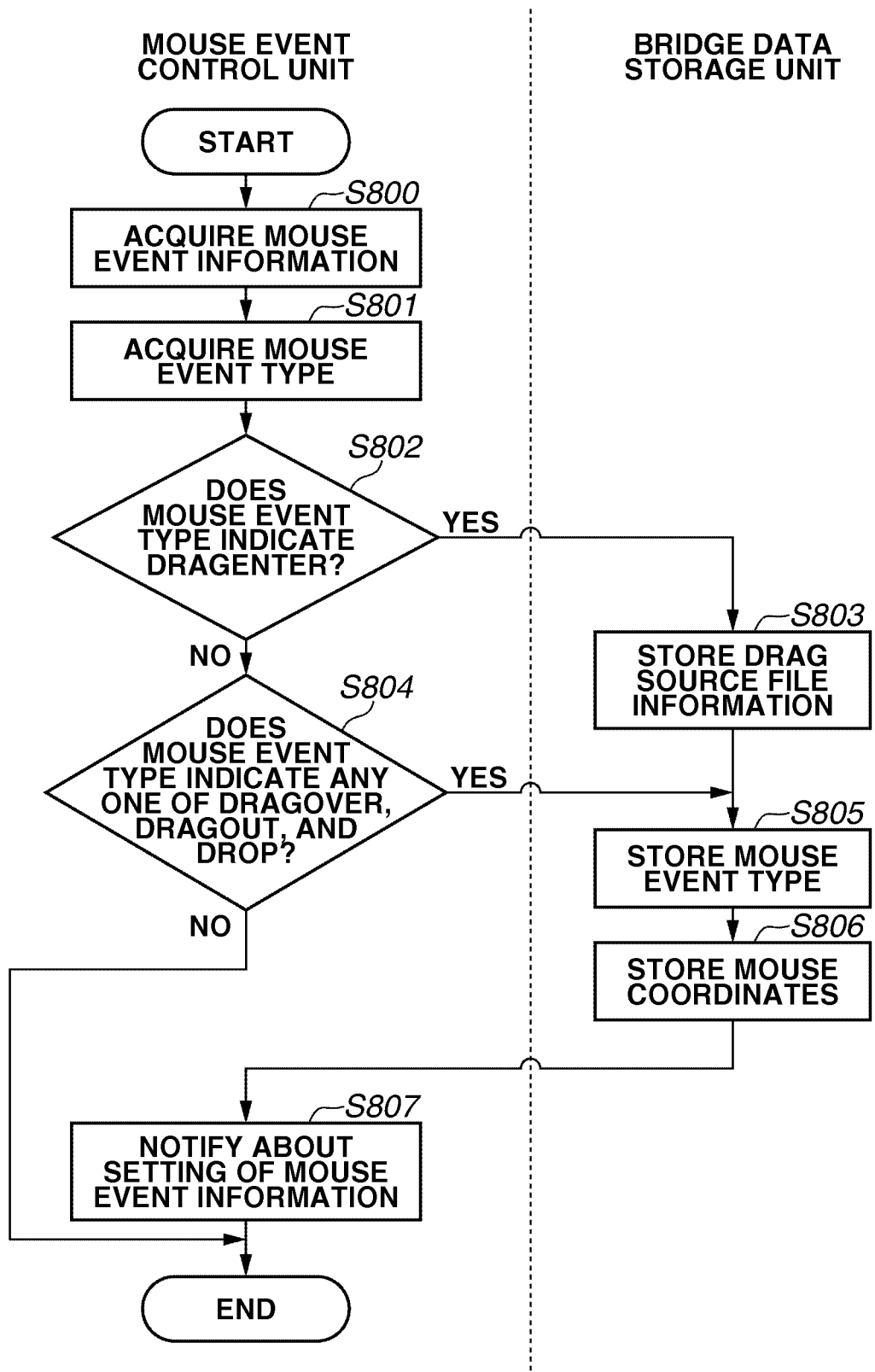

FIG.15
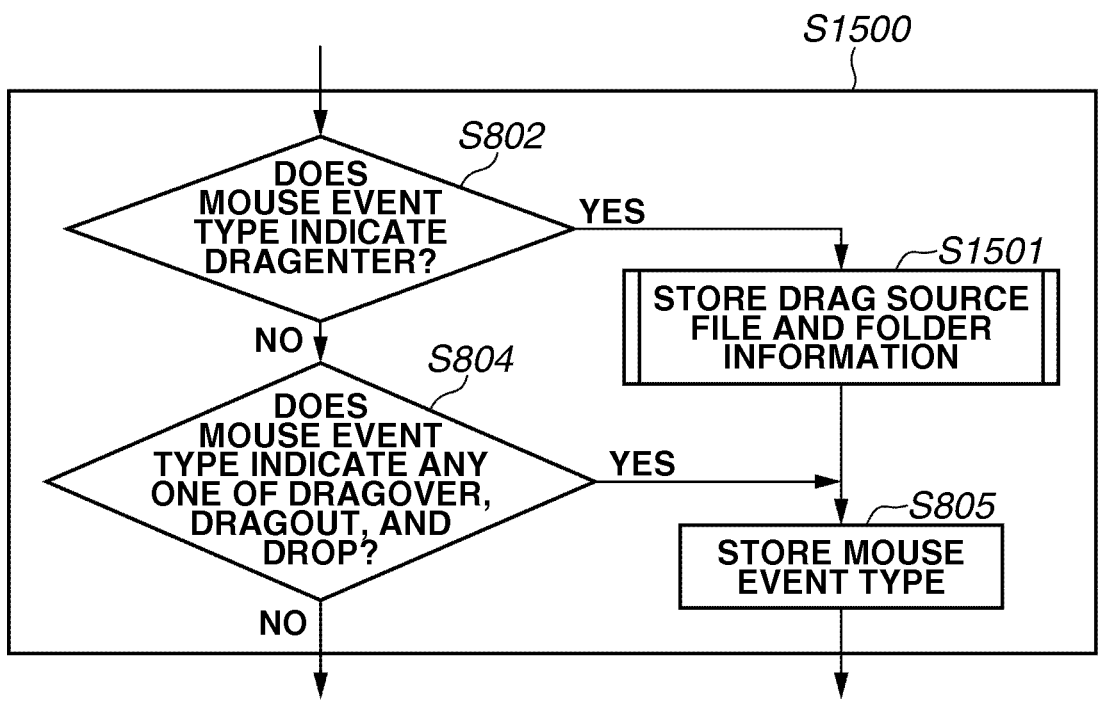
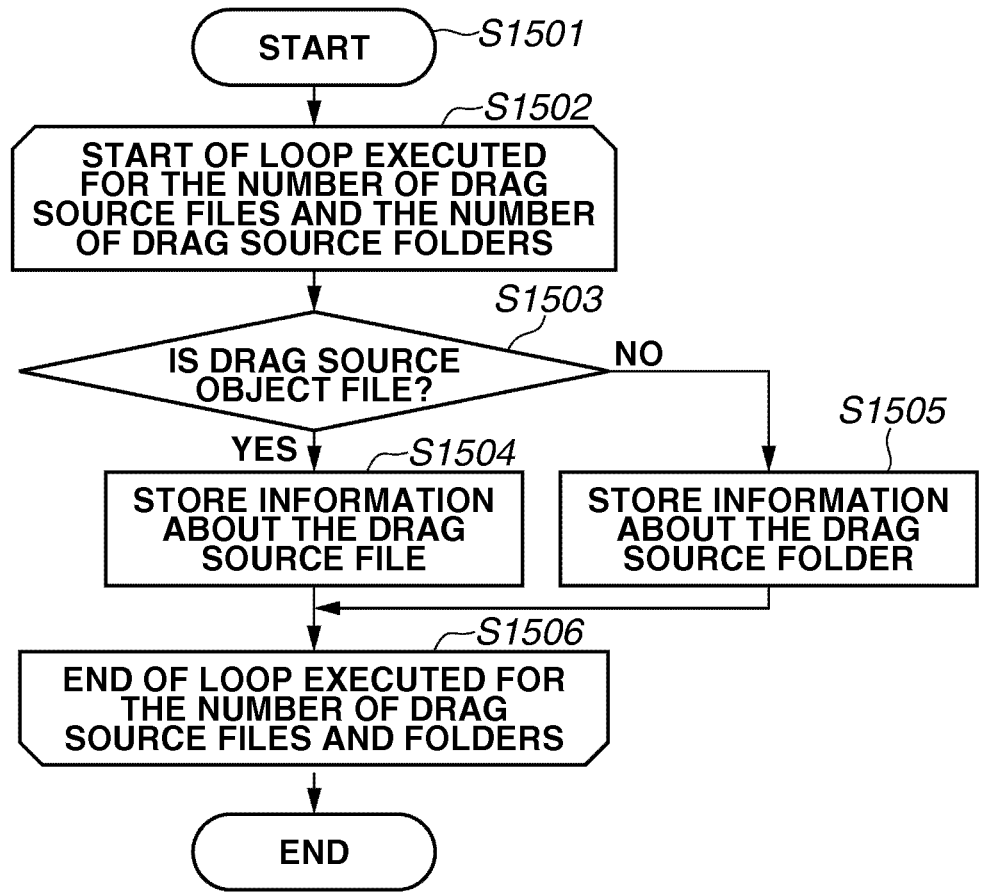

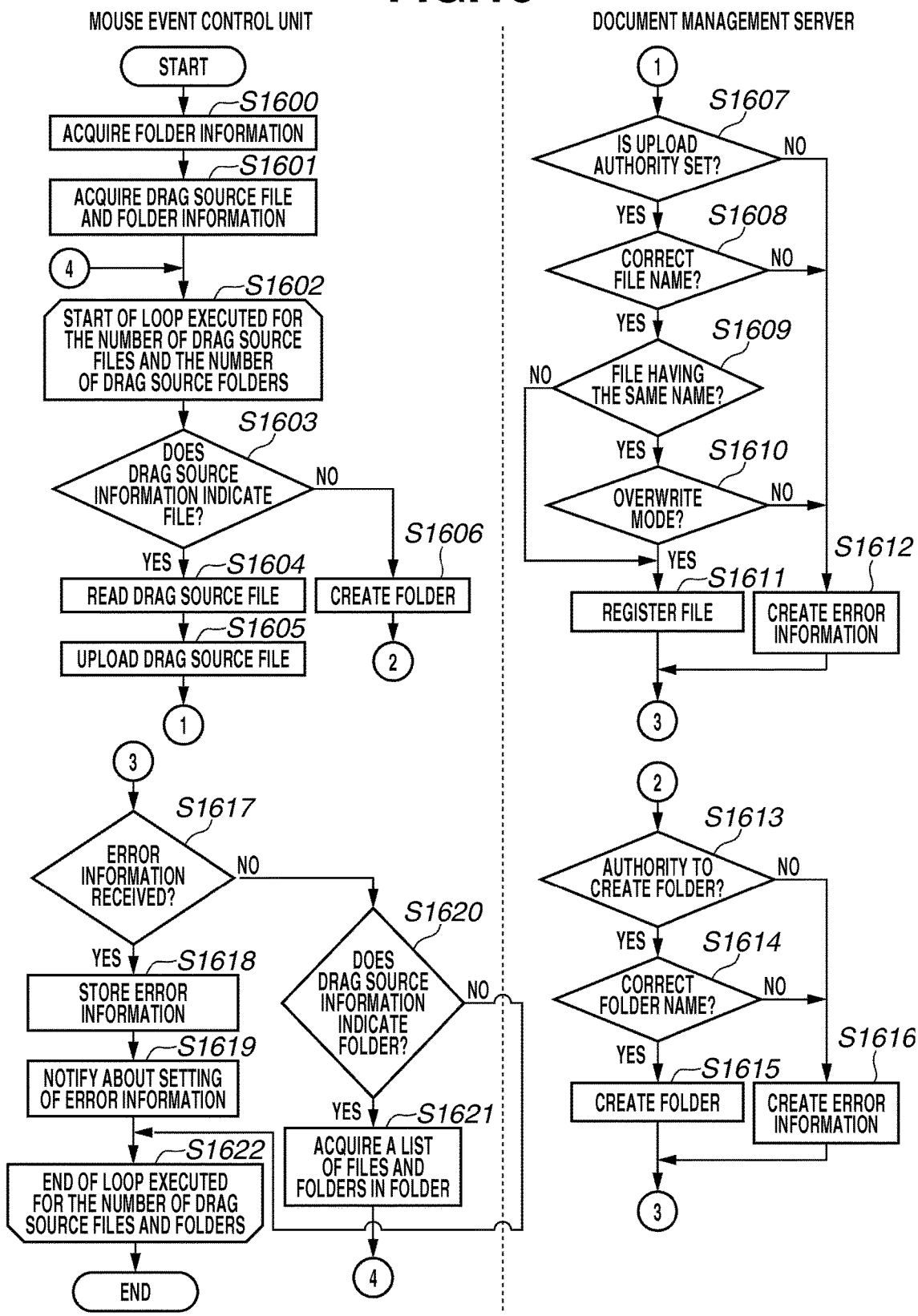

DOCUMENT MANAGEMENT PROGRAM FOR EXECUTING ON A WEB BROWSER FOR UPLOADING DOCUMENTS TO A DOCUMENT MANAGEMENT SERVER

TECHNICAL FIELD

The present invention relates to a document management program executed on a web browser for uploading documents to a document management server.

BACKGROUND ART

In recent years, document management systems are demanded to access a document management server through a general web browser (e.g., Microsoft® Internet Explorer®), without using any dedicated document management client applications.

According to Japanese Laid-Open Patent Application No. 2006-099741, a user uses a general web browser to register a document stored in a client terminal to a server. More specifically, the user specifies the name and path of the file to be registered to upload the document.

To save the trouble of having to specify the name and path of the file to be registered, it is desirable that the user is allowed to upload the file managed by a file system of an operating system (OS) or the like through a drag and drop (D&D) operation.

However, if the user drags and drops a file (e.g., a text file) managed by the OS onto a web browser such as Microsoft® Internet Explorer®, the web browser opens the file.

To solve this problem, in FIG. 9 of WO08/029774, the web browser displays a Hyper Text Markup Language (HTML) object (upload area) including an upload path. According to the technique discussed in WO08/029774, when the user drags and drops a file of the OS to the HTML object, the file is uploaded to a storage area corresponding to the upload path included in the HTML object.

However, document management servers generally use a hierarchical structure of a plurality of folders to classify document files. Thus, when the user accesses such a document management server through the web browser, it is desirable that the user be allowed to operate such a hierarchical folder structure in an interactive way.

A method for achieving the above is to execute an extended program for operating the hierarchical folder structure of the document management server on the web browser, by using a Rich Internet application (RIA) such as Adobe® Flash Player®.

However, according to the technique discussed in WO08/029774, a file can be uploaded only to a single storage area determined by an upload path associated with the HTML object. Therefore, based on the technique discussed in WO08/029774, since a file can be updated only to a single storage area determined by the upload path, even if an RIA is used to display the hierarchical folder structure, the user cannot drags and drops to upload the file of the OS in a desired folder of the displayed hierarchical folder structure.

According to an aspect of the present invention, there is provided a non-transitory computer-readable storage medium including a document management program configured to store first and second extended programs that operate on a web browser. The first extended program causes a computer to function as: a first acquisition unit configured to acquire information about a hierarchical folder structure managed by the document management server; a display unit configured to display the hierarchical folder structure managed by the document management server in a display area defined on the web browser, in accordance with the information acquired by the first acquisition unit; a second acquisition unit configured to acquire information about a coordinate position of a pointing device in the display area and information about an event type, based on mouse event information set by the web browser; a determination unit configured to compare the coordinate position of the pointing device acquired by the second acquisition unit with the position of each of the folders that are displayed by the display unit and are included in the hierarchical folder structure to determine whether the coordinate position of the pointing device overlaps with any one of the folders included in the hierarchical folder structure; and a folder information creation unit configured to create, if the determination unit determines that the coordinate position of the pointing device overlaps with a folder and if the event type acquired by the second acquisition unit is determined to be Drop, folder information about the folder determined to be overlapping with the coordinate position of the pointing device and set the created folder information in the web browser.

The second extended program causes the computer to function as: a third acquisition unit configured to acquire mouse event information related to the display area, based on a mouse event from an OS; a first storage unit configured to store, if an event type included in the mouse event information acquired by the third acquisition unit is determined to be DragEnter, information about the file being dragged in a bridge data storage unit; a second storage unit configured to store the mouse event information acquired by the third acquisition unit in the bridge data storage unit and notify the web browser that the mouse event information has been stored; and an upload unit configured to upload, if notified by the web browser that the folder information has been stored in the bridge data storage unit, a file identified by the file information stored in the bridge data storage unit to a folder that is identified by the folder information stored in the bridge data storage unit and that is managed by the document management server. When notified by the second storage unit that the mouse event information has been stored, the web browser acquires the mouse event information stored in the bridge data storage unit and sets the acquired mouse event information in the second acquisition unit. When the folder information creation unit sets folder information, the web browser stores the set folder information in the bridge data storage unit and notifies the upload unit that the folder information has been stored in the bridge data storage unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 5A illustrates a user interface (UI) configuration.
FIG. 5B illustrates a UI configuration.
FIG. 5C illustrates a UI configuration.
FIG. 5D illustrates a UI configuration.
FIG. 5E illustrates a UI configuration.
FIG. 6A is a main sequence diagram illustrating processes including acquisition of a mouse event and uploading of a file.
FIG. 7 is a flow chart illustrating a process flow of displaying folders according to a first exemplary embodiment of the present invention.
FIG. 8 is a flow chart illustrating a process flow of notifying the web browser of the mouse event according to the first exemplary embodiment of the present invention.
FIG. 15 is a flow chart illustrating a process flow of storing drag source files and folders according to a third exemplary embodiment of the present invention.
FIG. 16 is a flowchart illustrating a process flow of uploading files and folders according to the third exemplary embodiment of the present invention.

DESCRIPTION OF EMBODIMENTS

Various exemplary embodiments, features, and aspects of the invention will be described in detail below with reference to the drawings.

Example 1

Figure 1:
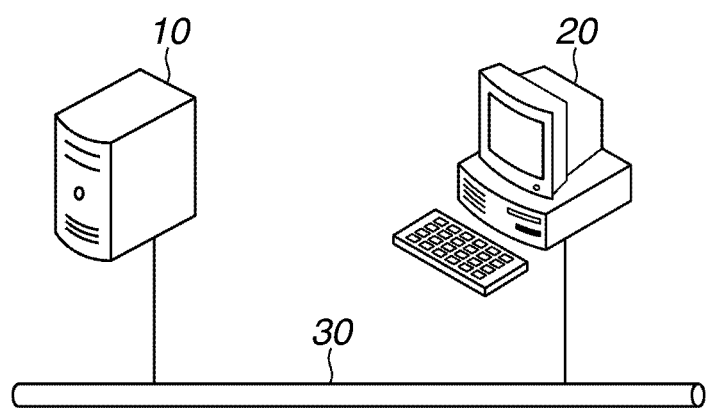
FIG. 1 illustrates a system configuration.

FIG. 1 illustrates a configuration of a system according to an exemplary embodiment of the present invention. The present exemplary embodiment is configured by a document management server PC 10 and a client PC 20 that are connected to each other via a local area network (LAN) 30.

The document management server PC 10 provides a document management function of managing contents such as documents and folders and a web application server function. The client PC 20 is connected to the document management server PC 10 via a web browser and provides a function of operating contents.

Figure 2:
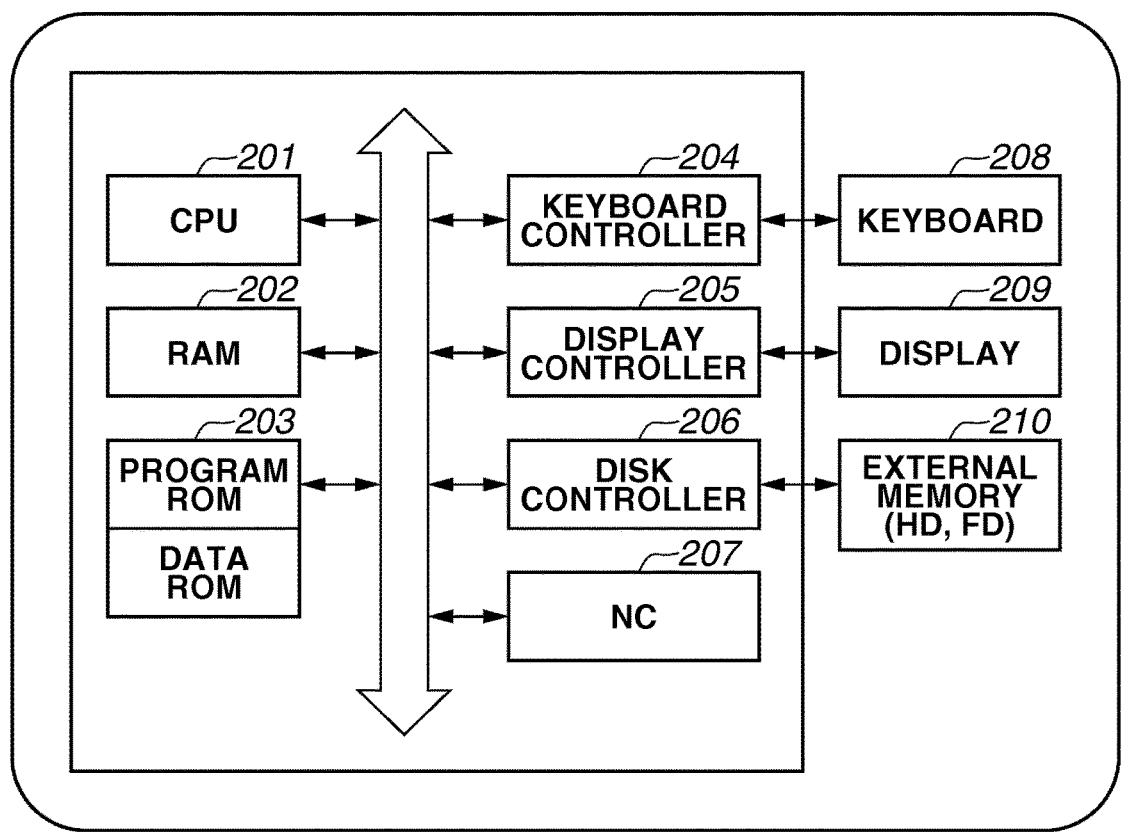
FIG. 2 is a block diagram illustrating a configuration of a document management server and a document management client.

Each of the document management server 10 and the client PC 20 can be configured by hardware of a general information processing apparatus (PC). FIG. 2 illustrates a hardware configuration of each of the PCs forming the document management system according to the present exemplary embodiment.

In FIG. 2, a central processing unit (CPU) 201 executes programs stored in a program read-only memory (ROM) in a ROM 203 and programs such as an OS and applications loaded from a hard disk 210 to a random access memory (RAM) 202.

By executing such programs stored in a computer-readable storage medium, the computer (CPU 201) functions as each of the processing units that execute processes in the following flow charts. The RAM 202 is a main memory of the CPU 201 and functions as a work area and the like.

A keyboard controller 204 controls the operation input from a keyboard 208 and a pointing device (not illustrated) such as a mouse, a touch pad, a touch panel, or a trackball. A display controller 205 controls display on a display 209.

A disk controller 206 controls data access to the external memory 210 such as a hard disk (HD) or a flexible disk (FD) storing various types of data. A network controller (NC) 207 is connected to a network and controls communication with other devices connected to the network.

Next, a process flow of the system according to a first exemplary embodiment of the present invention will be described.

Figure 3:
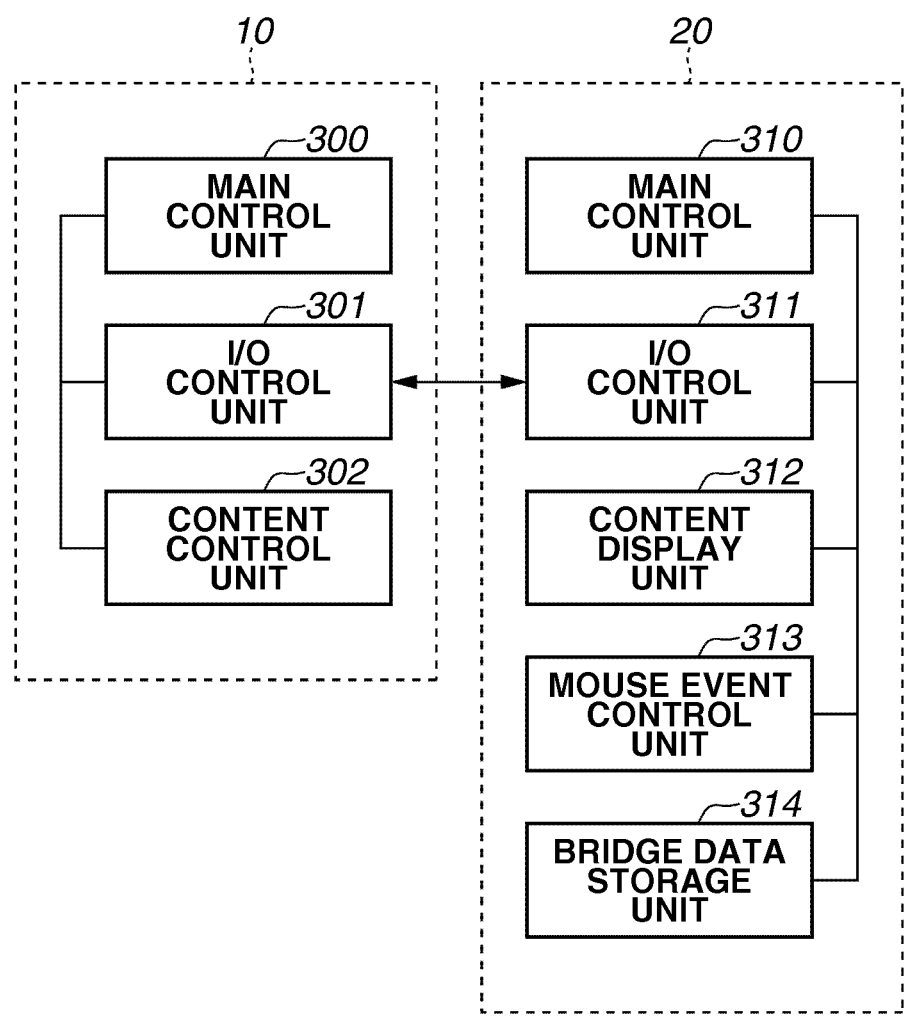
FIG. 3 illustrates a software configuration.

FIG. 3 illustrates a configuration of each of the processing units provided by the document management server PC 10 and the client PC 20 in the system according to the first exemplary embodiment of the present invention.

The CPU 201 of the document management server PC 10 executes programs to cause the document management server PC 10 to function as a main control unit 300, an input/output (I/O) control unit 301, and a content control unit 302. Information such as contents is held in the external memory 210, and when necessary, the information is loaded to the RAM 202 and is then processed.

The main control unit 300 of the document management server PC 10 executes main control processing responsible for the application of the document management server PC 10. In addition, the main control unit 300 controls the I/O control unit 301 and the content control unit 302, and exchanges content information and the like with the units 301 and 302.

The I/O control unit 301 receives a command request from the client PC 20 and transmits a command response to the client PC 20. The content control unit 302 acquires content information requested by the client PC 20. The content information may be managed on a database (DB) basis or on a file basis. The management format of the content information is not particularly limited.

The CPU 201 of the client PC 20 reads and executes programs corresponding to each unit to cause the client PC 20 to function as a main control unit 310, an I/O control unit 311, a content display unit 312, a mouse event control unit 313, and a bridge data storage unit 314.

The main control unit 310 of the client PC 20 executes main control processing responsible for the application of the client PC 20. In addition, the main control unit 310 controls the content display unit 312, the mouse event control unit 313, and the bridge data storage unit 314, and exchanges therewith content information and the like.

The I/O control unit 311 transmits a command request to the document management server PC 10 and receives a command response from the document management server PC 10.

The content display unit 312 interprets content information received from the document management server PC 10 and displays the content information on a web browser. The "content" signifies a document(s) or a folder(s) managing a document(s). In addition, the content display unit 312 determines whether mouse coordinates (a coordinate position indicated by a pointing device) acquired by the mouse event control unit 313 overlap with a displayed content.

In addition, the content display unit 312 displays an error message if the mouse event control unit 313 fails document upload processing. In addition, the program realizing the content display unit 312 discloses an interface for communicating with a web browser 400 via Java (registered trademark) Script.

The mouse event control unit 313 acquires mouse event information, based on a mouse event (an event made by a pointing device) supplied from a program (a program such as an OS) different from the web browser 400.

Based on the acquired mouse event information, the mouse event control unit 313 determines an event type, a coordinate position, and the content of the dragged file. In addition, the mouse event control unit 313 uploads the drag source file to a folder that is determined by the content display unit 312 to be overlapping with the mouse coordinates when dropped.

The program realizing the mouse event control unit 313 discloses an interface for communicating with the web browser 400 via Java Script, to notify the web browser 400 that information has been set in the bridge data storage unit 314.

The bridge data storage unit 314 stores information such as mouse event information and folder information displayed by the content display unit 312 and exchanges such information with the mouse event control unit 313. In addition, the program realizing the bridge data storage unit 314 discloses an interface with the web browser 400, for exchanging information such as mouse event information and folder information.

In the present exemplary embodiment, while an event made by a pointing device is referred to as a mouse event and a coordinate position of the pointing device as a mouse coordinate position, the type of the pointing device is not limited to a mouse.

Figure 4:
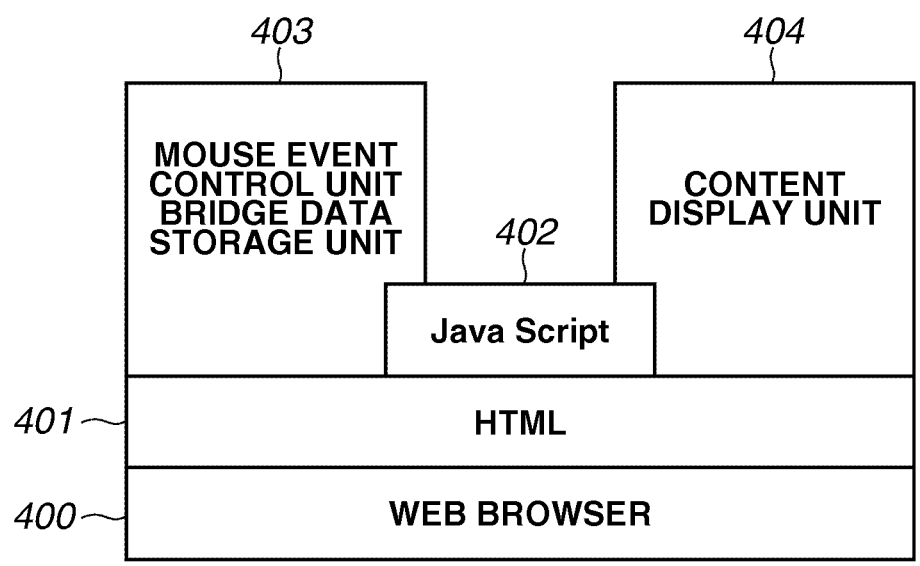
FIG. 4 illustrates a web browser configuration.

FIG. 4 illustrates a configuration of add-on programs (document management programs for causing the computer to function as the content display unit 312, the mouse event control unit 313, and the bridge data storage unit 314) executed on the web browser according to the first exemplary embodiment of the present invention.

The web browser 400 analyzes an HTML 401, executes a Java Script 402, and provides external extended functions add-ons 403 and 404.

The HTML 401 is a markup language for describing web pages that can be used on the web browser 400.

The Java Script 402 is a program (script program) described in a script language that can be used on the web browser 400. The Java Script 402 provides the web browser 400 with functions of receiving mouse event information from the mouse event control unit 313, setting information in the bridge data storage unit 314, acquiring information stored in the bridge data storage unit 314, and setting information acquired from the bridge data storage unit 314 in the content display unit 312.

The external extended functions add-ons 403 and 404 are extended programs (add-on programs) that extend functions of the web browser 400. The external extended function add-on 403 is an add-on program providing the functions of the mouse event control unit 313 and the bridge data storage unit 314. The external extended function add-on 404 is an add-on program providing the function of the content display unit 312.

The external extended function add-on 404 is a first extended program described by using an RIA such as Adobe Flash (trademark) that can operate on the web browser 400. The external extended function add-on 404 provides the function of the content display unit 312.

According to descriptions of an HTML web page read from the document management server PC 10, the web browser 400 defines a display area for displaying a screen defined by the external extended function add-on 404 in a window on the web browser 400. A screen (a user interface (UI) such as a main screen 500 in FIG. 5A) defined by the external extended function add-on 404 is displayed in the display area on the web browser 400.

In other words, the content display unit 312 realized by the external extended function add-on 404 displays documents and a hierarchical folder structure managed by the document management server PC 10 on the main screen 500 displayed in a window on the web browser 400.

The external extended function add-on 403 is a second extended program and uses ActiveX technology, to realize a function of acquiring mouse event information based on a mouse event generated by an OS (an external application different from the web browser 400) and a function of storing such mouse event information.

In addition, the external extended function add-on 403 exchanges the mouse event information and the folder information displayed on the main screen 500 with the external extended function add-on 404 via the Java Script 402.

Configured in this way, the system according to the present exemplary embodiment can allow the user to drag and drop a file managed by an OS or the like to a desired folder displayed on the main screen 500, and upload the file to the desired folder.

The main screen 500 in FIG. 5A displayed in a window of the web browser 400 by the content display unit 312 includes a header display area 501, a tree display area 502, a content display area 503, a property display area 504, and a footer display area 505.

The content display unit 312 displays a name, a menu, or the like of the document management system in the header display area 501. In addition, the content display unit 312 hierarchically displays folders storing documents in the tree display area 502.

In addition, the content display area 503 displays documents and/or folders stored in a folder selected in the tree display area 502. FIG. 5A illustrates the content display area 503 when a top folder is selected in the tree display area 502. The content display unit 312 can change the display format in the content display area 503. For example, when the user operates a switch button, the content display unit 312 switches the display format between icon display and list display.

In addition, the property display area 504 displays properties of a document (or a folder) selected in the content display area 503. The properties include information such as a name and path of the document. In addition, the footer display area 505 displays information about an application version or Copyrights.

The content display unit 312 acquires a coordinate position from the mouse event information, and determines whether the acquired mouse coordinates overlap with a folder displayed in the tree display area 502 or the content display area 503.

FIG. 5B illustrates coordinate information defined for one of the folders displayed in the tree display area 502 or the content display area 503. A folder display area 510 is an area that is defined to determine whether a displayed folder overlaps with a mouse coordinate position. The folder display area 510 uses the top left corner thereof as the start point and the bottom right corner thereof as the end point. If the folder display area 510 includes mouse coordinates 511, the content display unit 312 determines that the folder and the mouse coordinates 511 overlap with each other.

The defined shape of the folder display area 510 varies depending on the area in which the folder is displayed or on the display format. For example, the folder display area 510 of a folder displayed in the tree display area 502 is defined to have a rectangular area, as illustrated by an area 520 in FIG. 5C.

If the content display area 503 displays folders as icons, the folder display area 510 of a folder displayed in the content display area 503 is defined as illustrated by an area 530 in FIG. 5D.

If the content display area 503 displays folders as a list, the folder display area 510 of a folder displayed in the content display area 503 is defined as illustrated by an area 540 in FIG. 5E.

Next, a flow of the present system will be described with reference to a sequence and flow charts.

Figure 6B:
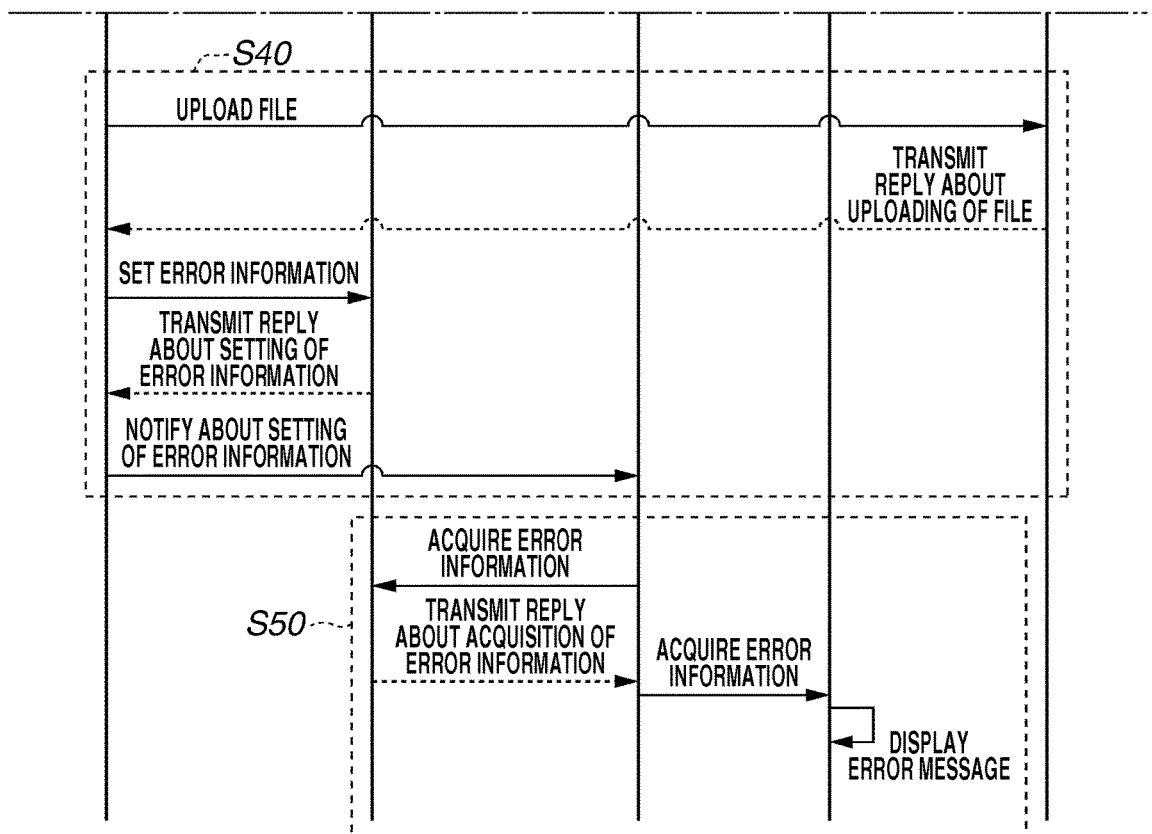
FIG. 6B is a main sequence diagram illustrating processes including acquisition of a mouse event and uploading of a file.

FIG. 6 (including FIGS. 6A and 6B) is a sequence diagram illustrating a series of flows executed when folders are displayed by using an RIA on the web browser 400, a file managed by an OS or the like of the client PC 20 is dragged and dropped, and the folder is uploaded to a corresponding folder on the document management server PC 10.

The sequence can be divided largely into the following five processes. More specifically, the five processes are a flow of displaying folders (S10), a flow of acquiring mouse event information (S20), a flow of determining whether mouse coordinates overlap with a folder (S30), a flow of uploading a file to a folder (S40), and a flow of displaying an error message (S50). Each of the processes will be described in detail.

First, in step S10, the content display unit 312 acquires information about folders (folder information) managed by the document management server PC 10. More specifically, the content display unit 312 transmits a folder information acquisition request to the document management server PC 10, and acquires a reply representing folder information from the document management server PC 10.

The folder information collectively includes a name and a unique ID representing a folder. The unique ID representing a folder may be a path. The content display unit 312 can simultaneously acquire folder information about a plurality of folders.

Next, based on the acquired folder information, the content display unit 312 displays folders in the tree display area 502 and the content display area 503. While defined by the content display unit 312 in this example, the folder display position and size may be defined by an internal resource or an external file.

In step S20, the mouse event control unit 313 acquires a mouse event generated by the OS of the client PC 20 and determines whether the mouse position is within the main screen 500, based on the acquired mouse event. If the mouse position is within the main screen 500, the mouse event control unit 313 sets the mouse event in the bridge data storage unit 314, as mouse event information. The mouse event information includes information about the event type, the coordinate position of the mouse, and the selected file (or the folder) being dragged.

Examples of the event type include DragEnter representing that the mouse has entered the main screen 500, DragOver representing that the mouse is being dragged over the main screen 500, DragOut representing that the mouse has left the main screen 500, and Drop representing that the dragged and selected file (folder) has been dropped onto the main screen 500.

The mouse event control unit 313 notifies the web browser 400 that the mouse event control unit 313 has stored the mouse event information in the bridge data storage unit 314.

In step S30, the web browser 400 acquires the mouse event information stored in the bridge data storage unit 314 and sets (notifies) the content display unit 312 with (of) the acquired mouse event information.

The content display unit 312 acquires the coordinate position included in the set mouse event information, and compares the coordinate position with the coordinate position of a folder displayed in the main screen 500, to determine whether the mouse overlaps with the displayed folder. If the content display unit 312 determines that the mouse overlaps with a folder, the content display unit 312 sets folder information about the folder determined to be overlapping with the mouse in the web browser 400.

The web browser 400 stores the set folder information in the bridge data storage unit 314 as upload destination folder information, and notifies the mouse event control unit 313 that the web browser 400 has set the folder information in the bridge data storage unit 314.

Instead of setting the folder information after the content display unit 312 determines that the mouse coordinate position overlaps with a folder, the content display unit 312 may display a screen to prompt the user to upload a folder. In this way, upon receiving upload instructions from the user, the content display unit 312 can set the folder information. In addition, in this way, if the user gives instructions to cancel the uploading, the content display unit 312 may not set the folder information.

In step S40, the mouse event control unit 313 acquires the upload destination folder information and information about the upload-target selected file (folder) from the bridge data storage unit 314. The mouse event control unit 313 uploads the selected file (folder) to the upload destination folder in the document management server PC 10.

The document management server PC 10 registers the received file (folder) in the specified upload destination folder. Next, the document management server PC 10 transmits a registration result to the mouse event control unit 313. The registration result includes a unique processing result number representing success or failure of the registration.

If the processing result number represents failure of the registration, the mouse event control unit 313 stores an error code (processing result number) as error information in the bridge data storage unit 314, and notifies the web browser 400 of setting of the error information.

In step S50, when notified of setting of the error information, the web browser 400 acquires the error information from the bridge data storage unit 314, and sets the acquired error information in the content display unit 312. The content display unit 312 displays an error message corresponding to the error code, based on the set error information.

Next, the above steps S10 to S50 will be described in detail with reference to flow charts.

FIG. 7 is a flow chart illustrating a process flow in which the content display unit 312 acquires folder information from the document management server PC 10, and displays folders on the main screen 500 on the web browser 400.

In step S700, to acquire folder information, the content display unit 312 creates and transmits a folder information acquisition request to the document management server PC 10.

Next, in step S701, upon receiving the folder information acquisition request, the document management server PC 10 acquires folder information about folders managed thereby from the content control unit 302, and transmits the acquired folder information as a response to the content display unit 312.

Next, step S702 is the start of a loop. From step S702, the content display unit 312 starts to execute steps S703 to S706 for the number of the transmitted items of folder information.

In step S703, the content display unit 312 displays folders in the tree display area 502, based on the folder information.

Next, in step S704, the content display unit 312 determines whether the icon display format or the list display format is specified as the display format of the content display area 503. If the content display unit 312 determines that the icon display format is specified (YES in step S704), the processing proceeds to step S705. If the content display unit 312 determines that the list display format is specified (NO in step S704), the processing proceeds to step S706.

In step S705, based on the folder information, the content display unit 312 displays corresponding folders as icons in the content display area 503. In step S706, based on the folder information, the content display unit 312 displays corresponding folders as a list in the content display area 503.

Step S707 is the end of the loop. If the content display unit 312 completes the processing for the number of the items of folder information, the content display unit 312 ends executing steps S703 to S706.

FIG. 8 is a flow chart illustrating a process flow in which the mouse event control unit 313 acquires mouse event information based on a mouse event from the OS and stores the mouse event information in the bridge data storage unit 314.

In step S800, based on a mouse event from the OS, the mouse event control unit 313 acquires mouse event information related to the main screen 500.

Next, in step S801, the mouse event control unit 313 acquires a mouse event type included in the mouse event information.

Next, in step S802, if the mouse event control unit 313 determines that the mouse event type indicates DragEnter (YES in step S802), the processing proceeds to step S803. In step S803, the mouse event control unit 313 stores drag source file information (information about the file being dragged), which is included in the mouse event information, in the bridge data storage unit 314.

On the other hand, if the mouse event control unit 313 determines that the mouse event type indicates other than DragEnter (NO in step S802), the processing proceeds to step S804. In step S804, the mouse event control unit 313 determines whether the mouse event type is any one of DragOver, DragOut, and Drop. If the mouse event control unit 313 determines that the mouse event type indicates any one of DragOver, DragOut, and Drop (YES in step S804), the processing proceeds to step S805. If not (NO in step S804), the processing proceeds to end.

In step S805, the mouse event control unit 313 stores the mouse event type, which is included in the mouse event information, in the bridge data storage unit 314.

In step S806, the mouse event control unit 313 acquires a mouse coordinate position included in the mouse event information, converts the mouse coordinate position into relative coordinates by using the top left corner of the main screen 500 as the origin, and stores the relative coordinates in the bridge data storage unit 314.

In step S807, the mouse event control unit 313 notifies the web browser 400 that the mouse event control unit 313 has stored the mouse event information in the bridge data storage unit 314.

Figure 9:
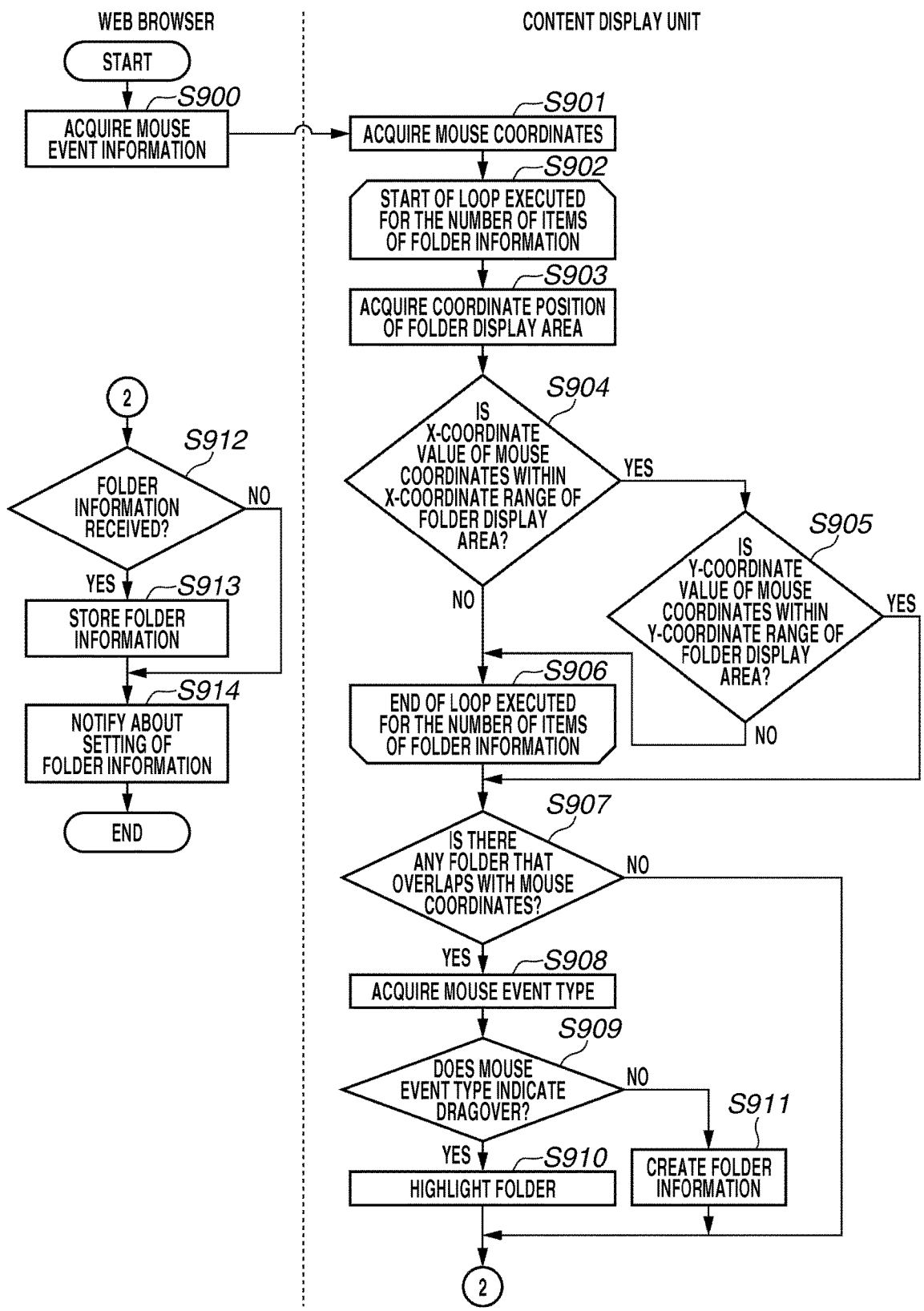
FIG. 9 is a flow chart illustrating a process flow of determining a folder overlapping with a mouse position according to the first exemplary embodiment of the present invention.

FIG. 9 is a flow chart illustrating a process flow in which the content display unit 312 determines whether the mouse overlaps with a folder based on the mouse coordinate position included in the mouse event information.

In step S900, when notified that the mouse event control unit 313 has stored the mouse event information in the bridge data storage unit 314 in step S807, the web browser 400 acquires the stored mouse event information, and sets the mouse event information in the content display unit 312.

In step S901, the content display unit 312 acquires the mouse coordinate position included in the set mouse event information.

Step S902 is the start of a loop. From step S902, the content display unit 312 sequentially examines the folders displayed in the tree display area 502 and the content display area 503. In other words, the content display unit 312 executes steps S903 to S905 for the number of the displayed folders.

In step S903, the content display unit 312 acquires the coordinate position of the folder display area 510 of a target folder to be examined (the areas 520 to 540 in FIGS. 5B to 5E).

In step S904, the content display unit 312 compares the X-coordinate value of the mouse coordinates with the X-coordinate range of the folder display area 510 of the target folder to be examined. If the content display unit 312 determines that the X-coordinate value of the mouse coordinates is within the range (YES in step S904), the processing proceeds to step S905. In step S905, the content display unit 312 compares the Y-coordinate value of the mouse coordinates with the Y-coordinate range of the folder display area 510. If the content display unit 312 determines that the Y-coordinate value of the mouse coordinates is within the range (YES in step S905), the content display unit 312 ends the loop processing, and the processing proceeds to step S907.

Step S906 is the end of the loop. If in step S904 or S905 the content display unit 312 determines that the mouse coordinates are outside the folder display area of the target folder to be examined, the target folder to be examined is changed to the next folder, and the above steps S903 to S905 are executed on the next folder. If the content display unit 312 has examined all the displayed folders and determined that no folder overlaps with the mouse coordinates (NO in step S907), the content display unit 312 ends the loop processing.

In step S907, if the content display unit 312 determines that a folder overlaps with the mouse coordinates (YES in step S907), the processing proceeds to step S908. In step S908, the content display unit 312 acquires a mouse event type included in the mouse event information.

In step S909, the content display unit 312 determines whether the acquired mouse event type indicates DragOver or Drop. If the content display unit 312 determines that the acquired mouse event type indicates DragOver (YES in step S909), the processing proceeds to step S910. In step S910, among the folders displayed in the main screen 500, the content display unit 312 highlights the folder determined to be overlapping with the mouse coordinates.

On the other hand, if in step S909 the content display unit 312 determines that the acquired mouse event type indicates Drop (NO in step S909), the processing proceeds to step S911. In step S911, the content display unit 312 creates folder information about the folder determined to be overlapping with the mouse coordinates, and transmits the folder information to the web browser 400. The folder information created in step S911 represents a name and a unique ID representing the folder (i.e., information identifying the upload destination folder).

In step S912, if the web browser 400 determines that the web browser 400 has received the folder information about the folder onto which the file has been dropped (i.e., the folder information has been set) (YES in step S912), the processing proceeds to step 913, and the web browser 400 stores the folder information in the bridge data storage unit 314.

In step S914, the web browser 400 notifies the mouse event control unit 313 that the web browser 400 has stored the folder information in the bridge data storage unit 314.

Figure 10:
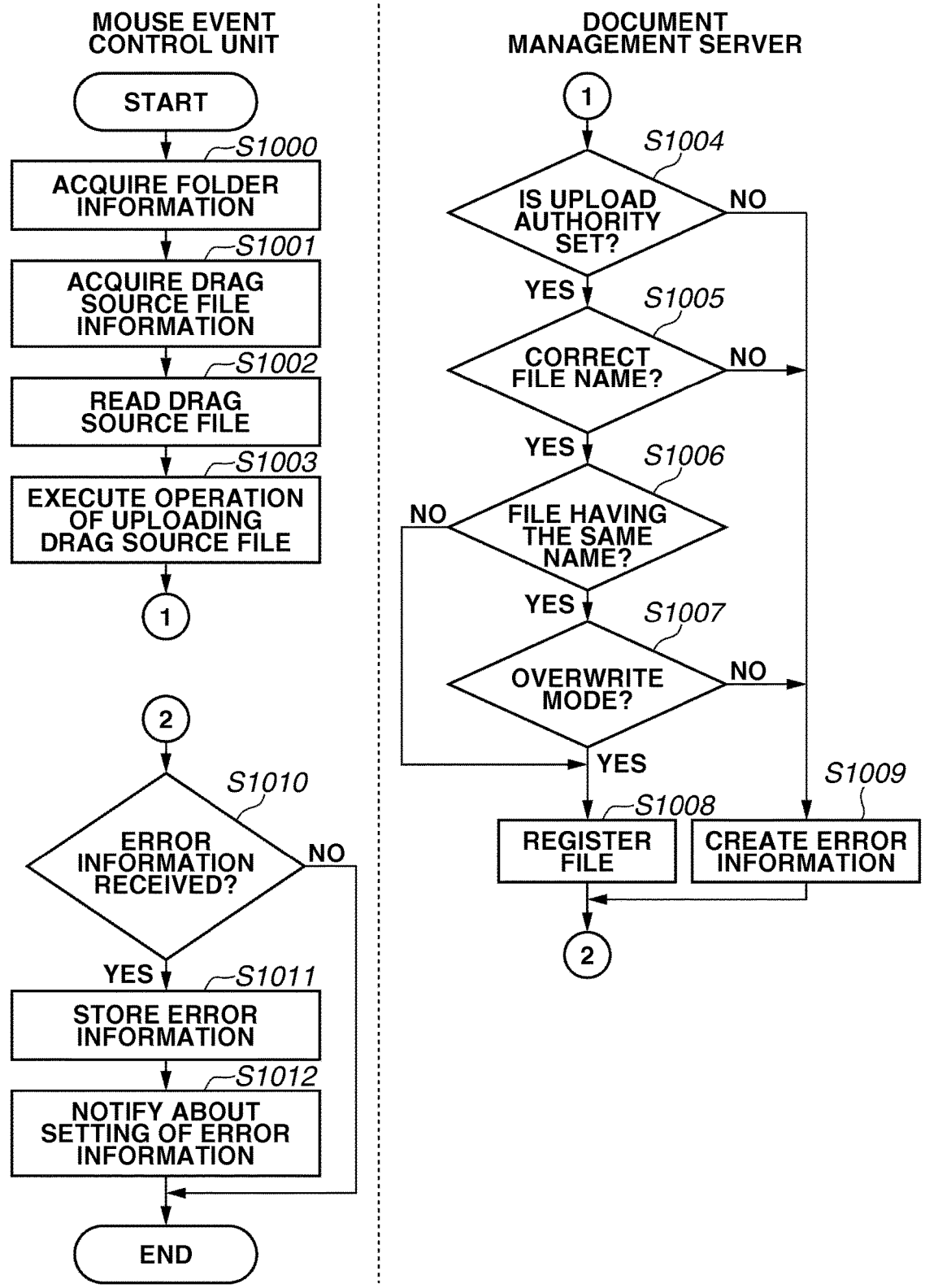
FIG. 10 is a flow chart illustrating a process flow of uploading a file according to the first exemplary embodiment of the present invention.

FIG. 10 is a flow chart illustrating a process flow in which the mouse event control unit 313 acquires the folder information stored in the bridge data storage unit 314, and uploads the file being dragged to the target folder of the document management server PC 10.

In step S1000, the mouse event control unit 313 acquires the folder information (information about the upload destination folder) stored in the bridge data storage unit 314 in step S913.

In step S1001, the mouse event control unit 313 acquires the drag source file information (information about the file to be dragged) stored in the bridge data storage unit 314 in step S803.

In step S1002, the mouse event control unit 313 acquires a file path included in the drag source file information, and reads the target file specified by the acquired file path.

In step S1003, the mouse event control unit 313 executes an operation of uploading the read target file to the folder identified by the folder information acquired in step S1000.

In step S1004, the content control unit 302 of the document management server PC 10 determines whether the mouse event control unit 313 has upload authority to upload the file to the specified folder. If the content control unit 302 determines that the mouse event control unit 313 has no such upload authority (NO in step S1004), the processing proceeds to step S1009.

On the other hand, if the mouse event control unit 313 has upload authority (YES in step S1004), the processing proceeds to step S1005. In step S1005, the content control unit 302 determines whether the target file has a correct file name. Examples of the incorrect file name may be defined by an internal resource or an external file. If in step S1005, the file has an incorrect file name (NO step S1005), the processing proceeds to step S1009.

If the content control unit 302 determines that the file has a correct filename (YES in step S1005), the processing proceeds to step S1006. In step S1006, the content control unit 302 determines whether the upload destination folder includes a file having the same name. If the content control unit 302 determines that the upload destination folder does not include a file having the same name (NO in step S1006), the processing proceeds to step S1008. On the other hand, if the upload destination folder includes a file having the same name (YES in step S1006), the processing proceeds to step S1007.

In step S1007, the content control unit 302 determines whether to overwrite the file having the same name in the upload destination folder with the target file. If the content control unit 302 determines that the file having the same name needs to be overwritten (for example, in an overwrite mode) (YES in step S1007), the processing proceeds to step S1008. If not (NO in step S1007), the processing proceeds to step S1009.

In step S1008, the content control unit 302 registers the target file to the upload destination folder, and notifies the mouse event control unit 313 of successful completion of the registration.

In step S1009, the content control unit 302 creates error information including an error code identifying an error type, and transmits the error information to the mouse event control unit 313.

In step S1010, the mouse event control unit 313 determines reception of the error information. If the mouse event control unit 313 receives the error information (YES in step S1010), the processing proceeds to step S1011. In step S1011, the mouse event control unit 313 stores the error information in the bridge data storage unit 314.

In step S1012, the mouse event control unit 313 notifies the web browser 400 that the mouse event control unit 313 has stored the error information in the bridge data storage unit 314.

Figure 11:
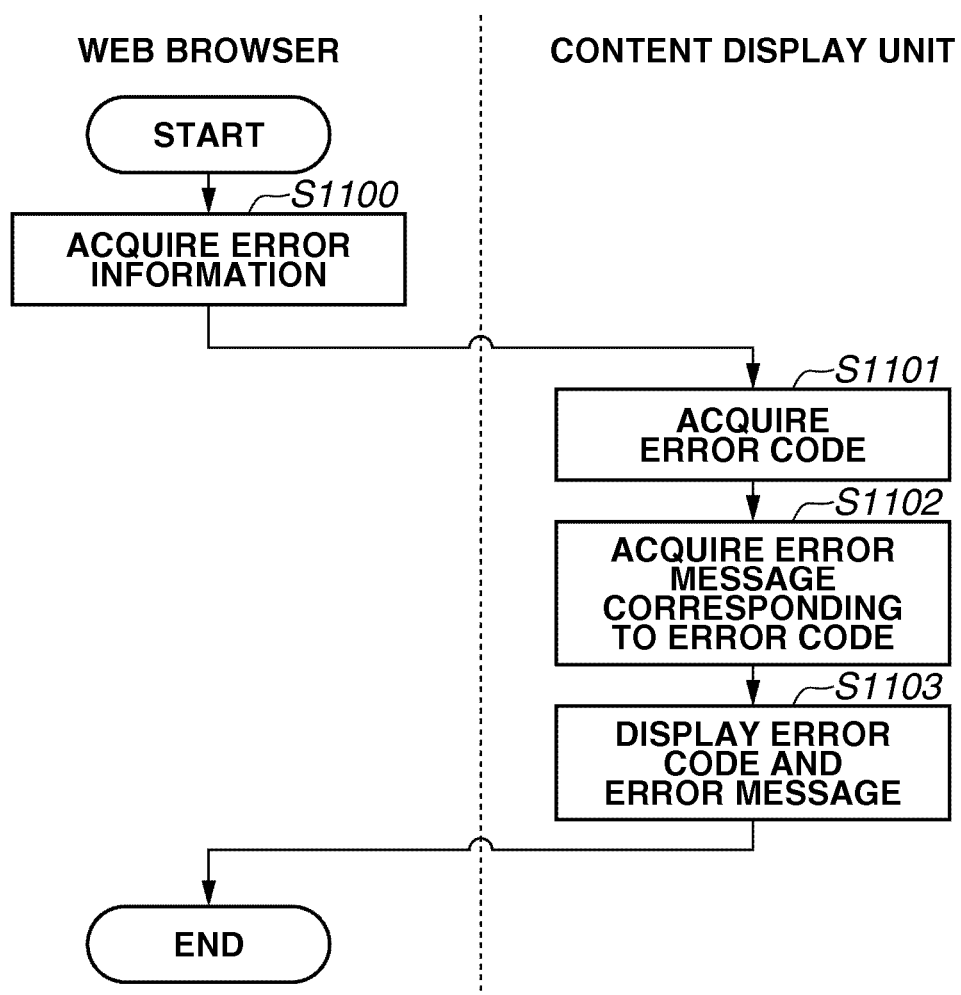
FIG. 11 is a flow chart illustrating a process flow of displaying an error message when uploading of the file fails according to the first exemplary embodiment of the present invention.

FIG. 11 is a flow chart illustrating a process flow in which the web browser 400 acquires the error information from the bridge data storage unit 314 and sets the error information in the content display unit 312, and the content display unit 312 displays an error message.

When notified by the mouse event control unit 313 that the error information has been stored in step S1012, in step S1100, the web browser 400 acquires the error information from the bridge data storage unit 314 and sets the acquired error information in the content display unit 312.

In step S1101, the content display unit 312 acquires the error code included in the set error information.

In step S1102, the content display unit 312 acquires an error message corresponding to the acquired error code. Such error message corresponding to an error code may previously be defined as an internal resource or in an external file.

In step S1103, the content display unit 312 displays the error code and error message on a screen.

Example 2

Next, a process flow of a system according to a second exemplary embodiment of the present invention will be briefly described with reference to FIGS. 12 to 14.

In the above first exemplary embodiment, as illustrated in FIG. 9, after acquiring mouse coordinates from the mouse event information in step S901, the content display unit 312 determines whether the mouse overlaps with a folder in steps S902 to S906. In the second exemplary embodiment, the main screen 500 displays the mouse position and an icon that identifies whether the mouse during dragging is located in an area where uploading is possible.

In the second exemplary embodiment, steps S803 to S805 in FIG. 8 and steps S901 and S902 in FIG. 9 described in the first exemplary embodiment are modified. Since other elements are the same as those according to the first exemplary embodiment, only the difference will be described with reference to the drawings and flow charts below.

Figure 12:
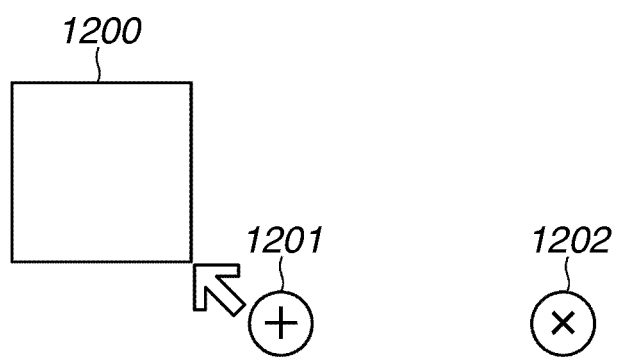
FIG. 12 illustrates mouse icons according to a second exemplary embodiment of the present invention.

FIG. 12 illustrates a mouse position and icons indicating whether uploading is possible or not, which are displayed on the main screen 500 by the content display unit 312.

A dragged icon 1200 is displayed when a file is being dragged on the main screen 500. An upload possible icon 1201 indicating that uploading is possible is attached to the dragged icon 1200. The upload possible icon 1201 is displayed under the current mouse coordinates when uploading is possible.

If the current mouse coordinates exist in an area where uploading is not possible, instead of the upload possible icon 1201 indicating that uploading is possible, an upload impossible icon 1202 indicating that uploading is not possible is attached to the dragged icon 1200.

The dragged icon 1200, the upload possible icon 1201, and the upload impossible icon 1202 may be defined as an internal resource or in an external file. In addition, these icons 1200 to 1202 may be designed arbitrarily, as long as the mouse position and upload possible/impossible can be indicated.

Next, a flow of a system according to the second exemplary embodiment will be described with reference to flow charts.

Figure 13:
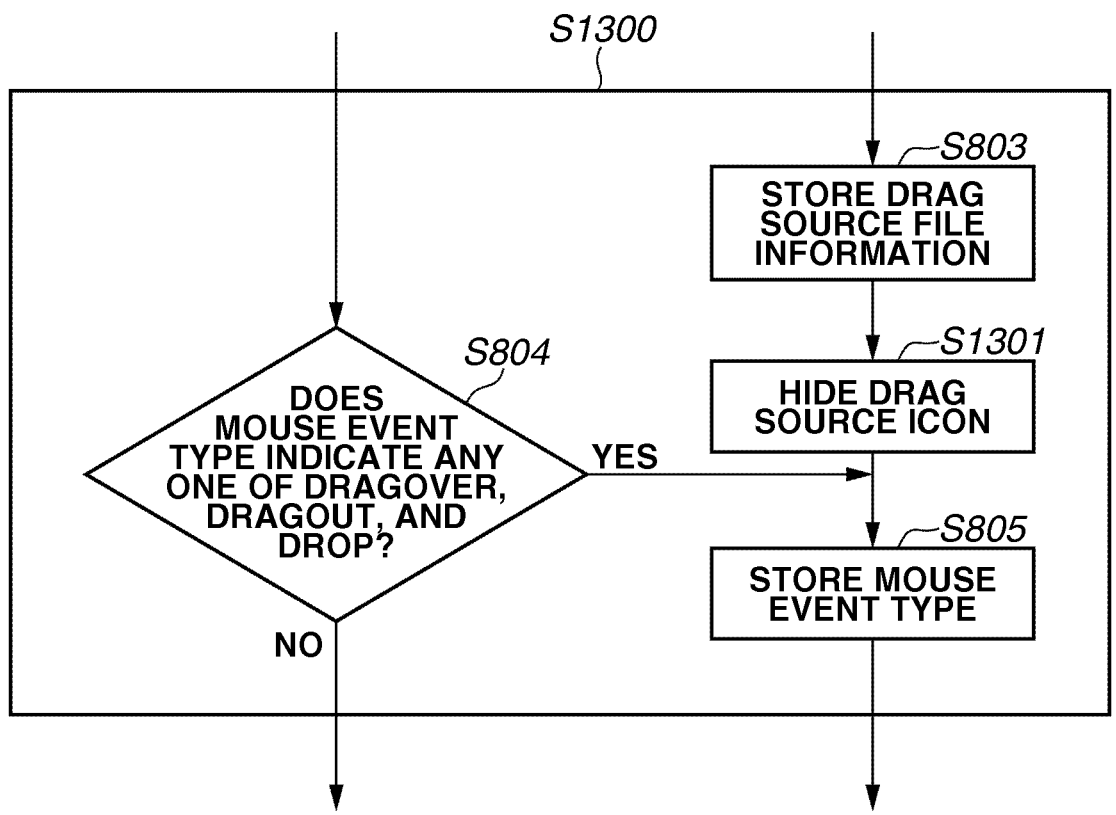
FIG. 13 is a flow chart illustrating a process flow of hiding a drag source icon according to the second exemplary embodiment of the present invention.

Step S1300 in FIG. 13 can replace steps S803 to S805 in FIG. 8, to hide the drag source icon.

In step S1301, the mouse event control unit 313 hides the dragged icon displayed by the drag source program. The method for hiding the icon is not limited. For example, a transparent icon may be superimposed or icon information may be deleted.

Figure 14:
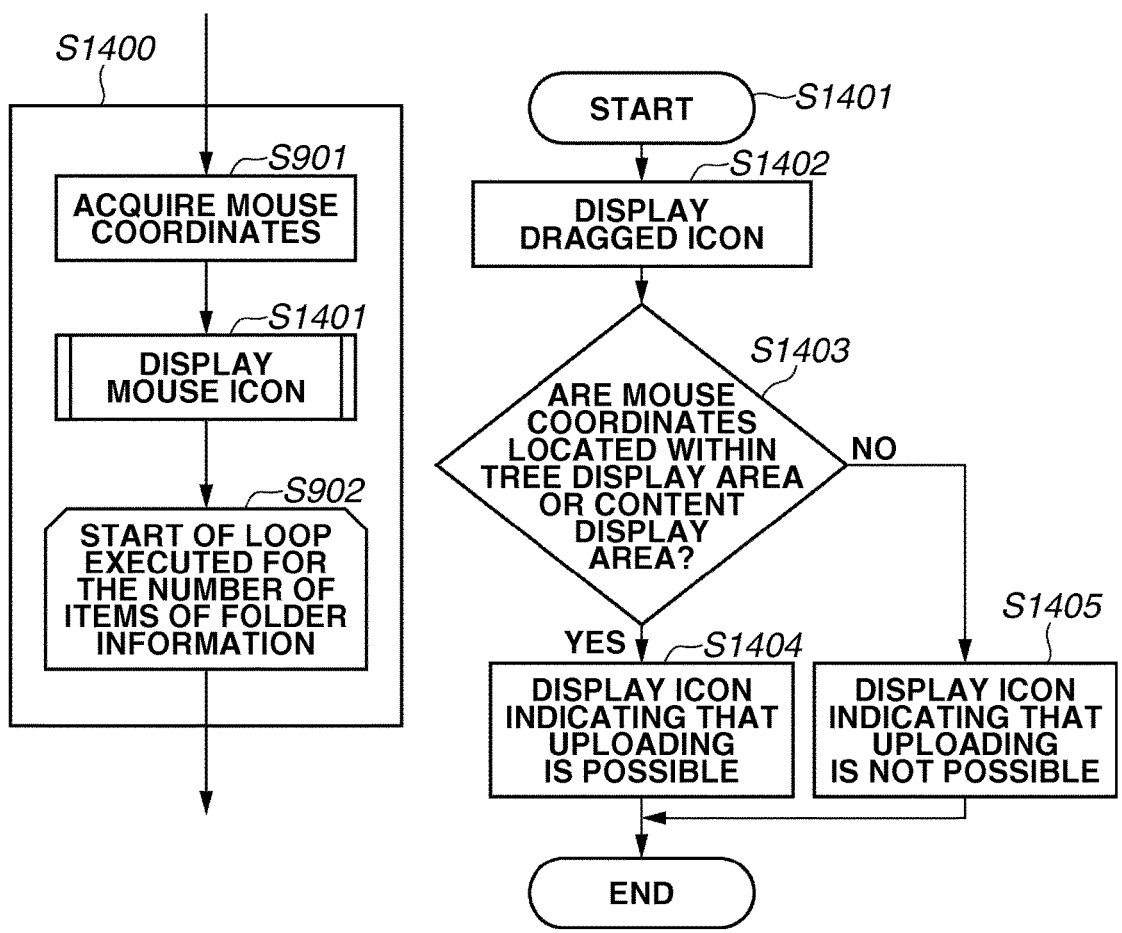
FIG. 14 is a flow chart illustrating a process flow of displaying a mouse icon according to the second exemplary embodiment of the present invention.

Step S1400 in FIG. 14 can replace steps S901 and S902 in FIG. 9, to display the dragged icon 1200. Step S1401 is added after step S901.

In step S1401, the dragged icon 1200 and the upload possible icon 1201 (or the upload impossible icon 1202) are displayed. Step S1401 will be described with reference to steps S1402 to S1405 in detail below.

In step S1402, the content display unit 312 displays the dragged icon 1200.

In step S1403, if the content display unit 312 determines that the mouse coordinates are located within the tree display area 502 or the content display area 503 (YES in step S1403), the processing proceeds to step S1404. In step S1404, the content display unit 312 displays the upload possible icon 1201.

On the other hand, if the content display unit 312 determines that the mouse coordinates are located within an area such as the header display area 501, the property display area 504, or the footer display area 505 (NO in step S1403), the processing proceeds to step S1405. In step S1405, the content display unit 312 displays the upload impossible icon 1202.

Example 3

Next, a process flow of a system according to a third exemplary embodiment of the present invention will be described briefly with reference to FIGS. 15 and 16.

In the above first exemplary embodiment, in FIG. 10, based on the file information stored in the bridge data storage unit 314, the mouse event control unit 313 uploads a single file to the document management server PC 10.

In the third exemplary embodiment, the user can collectively drag and drop a plurality of files and folders to upload thereof. In the third exemplary embodiment, step S803 in FIG. 8 and FIG. 10 are modified. Since other elements are the same as those in the first exemplary embodiment, only the difference will be described with reference to flow charts below.

Step S1500 in FIG. 15 includes step S1501 that can replace step S803 in FIG. 8. In this way, a plurality of drag source files and folders can be stored in the bridge data storage unit 314. Step S1501 will be described in detail with reference to steps S1502 to S1505.

Steps S1502 and S1506 are ends of a loop in which the mouse event control unit 313 sequentially examines a plurality of drag source files and folders selected by the user, and executes steps S1503 to S1505 for the number of the selected files and folders.

In step S1503, the mouse event control unit 313 determines the type of the drag source object. If the drag source object is a file (YES in step S1503), the processing proceeds to step S1504. In step S1504, the mouse event control unit 313 stores information about the drag source file in the bridge data storage unit 314.

On the other hand, if the drag source object is a folder (NO in step S1503), the processing proceeds to step S1505. In step S1505, the mouse event control unit 313 stores information about the drag source folder in the bridge data storage unit 314.

FIG. 16 is a modified flow chart of FIG. 10, for enabling uploading a plurality of drag source files and folder. If the drag source object is a folder (NO in step S1503), a folder is created in the document management server PC 10, and the internal file is uploaded. In addition, if the folder includes a folder, upload processing is executed recursively.

In step S1600, the mouse event control unit 313 acquires folder information (information about the upload destination folder) stored in the bridge data storage unit 314.

In step S1601, the mouse event control unit 313 acquires the drag source file and folder information stored in step S1500 from the bridge data storage unit 314.

Step S1602 is a loop end, and the mouse event control unit 313 executes steps S1603 to S1621 for the number of the drag source files and the number of the drag source folders.

In step S1603, if the mouse event control unit 313 determines that the type of the drag source information stored in the bridge data storage unit 314 indicates the drag source file information (YES in step S1603), the processing proceeds to step S1604. In step S1604, the mouse event control unit 313 acquires a file path from the drag source file information to read the file.

In step S1605, the mouse event control unit 313 uploads the read file to the folder of the document management server PC 10 acquired in step S1600.

If the mouse event control unit 313 determines that the drag source information stored in the bridge data storage unit 314 indicates drag source folder information (NO in step S1603), the processing proceeds to step S1606. In step S1606, the mouse event control unit 313 acquires a folder name from the drag source folder information and requests the document management server PC 10 to create a folder.

In step S1607, the content control unit 302 of the document management server PC 10 determines whether the mouse event control unit 313 has authority to upload the file to the specified folder. If the content control unit 302 determines that the mouse event control unit 313 has no such authority (NO in step S1607), the processing proceeds to step S1612.

If the mouse event control unit 313 has upload authority (YES in step S1607), the processing proceeds to step S1608.

In step S1608, the content control unit 302 determines whether the target file has a correct file name.

If the content control unit 302 determines that the file has a correct file name (YES in step S1608), the processing proceeds to step S1609. In step S1609, the content control unit 302 determines whether the upload destination folder includes a file having the same name.

If the content control unit 302 determines that the upload destination folder does not include a file having the same name (NO in step S1609), the processing proceeds to step S1611. On the other hand, if the upload destination folder includes a file having the same name (YES in step S1609), the processing proceeds to step S1610.

In step S1610, the content control unit 302 determines whether to overwrite with the target file the file having the same name in the upload destination folder. If the content control unit 302 determines that the file having the same name needs to be overwritten (for example, in an overwrite mode) (YES in step S1610), the processing proceeds to step S1611. If not (NO in step S1610), the processing proceeds to step S1612.

In step S1611, the content control unit 302 registers the target file to the upload destination folder, and notifies the mouse event control unit 313 of successful completion of the registration.

In step S1612, the content control unit 302 creates error information including an error code identifying an error type, and transmits the error information to the mouse event control unit 313.

In step S1613, the content control unit 302 determines whether the content control unit 302 has authority to create a folder. If the content control unit 302 has no such authority (NO in step S1613), the processing proceeds to step S1616. In step S1616, the content control unit 302 creates error information including an error code, and transmits the error information to the mouse event control unit 313.

If the content control unit 302 has authority to create a folder (YES in step S1613), the processing proceeds to step S1614. In step S1614, the content control unit 302 determines whether a correct folder name is specified.

If the content control unit 302 determines that a correct folder name is specified (YES in step S1614), the processing proceeds to step S1615. In step S1615, the content control unit 302 creates a folder and notifies the mouse event control unit 313 of successful completion of the process.

On the other hand, if the content control unit 302 determines that an incorrect folder name is specified (NO in step S1614), the processing proceeds to step S1616. In step S1616, the content control unit 302 creates error information including an error code, and transmits the error information to the mouse event control unit 313.

Next, in step S1617, the mouse event control unit 313 determines whether the mouse event control unit 313 has received the error information. If the mouse event control unit 313 has received the error information (YES in step S1617), the processing proceeds to step S1618. In step S1618, the mouse event control unit 313 stores the error information in the bridge data storage unit 314. Next, in step S1619, the mouse event control unit 313 notifies the web browser 400 that the mouse event control unit 313 has stored the error information in the bridge data storage unit 314.

If the mouse event control unit 313 determines no reception of the error information (NO step S1617), the processing proceeds to step S1620. In step S1620, the mouse event control unit 313 examines the drag source information stored in the bridge data storage unit 314.

In step S1620, if the mouse event control unit 313 determines that the drag source information stored in the bridge data storage unit 314 indicates a folder (YES in step S1620), the processing proceeds to step S1621. In step S1621, the mouse event control unit 313 acquires a folder path from the drag source information to acquire a list of files and folders in the folder. The mouse event control unit 313 returns to step S1602 and recursively processes the list of files in the folder.

On the other hand, in step S1620, if the mouse event control unit 313 determines that the drag source information stored in the bridge data storage unit 314 indicates a file (NO in step S1620), the processing proceeds to step S1622.

Step 1622 is a loop end, and when it is determined that all the processing for the drag source files and the drag source folders are completed, the loop is ended.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-113827 filed May 20, 2011, which is hereby incorporated by reference herein in its entirety.

The invention claimed is:

1. A non-transitory computer-readable storage medium storing a document management program including first and second extended programs that operate on a web browser and a script program described in a predetermined script language,
   wherein the first extended program causes a computer to function as:
   a first acquisition unit configured to acquire information about a hierarchical folder structure managed by a document management server, wherein the document management server is different from the computer;
   a display unit configured to hierarchically display, in a display area defined on the web browser according to descriptions of an HTML web page, folders of the hierarchical folder structure managed by the document management server, according to the information acquired by the first acquisition unit;
   a second acquisition unit configured to acquire information about a coordinate position of a pointing device in the display area and information about an event type, from mouse event information set by the web browser;
   a determination unit configured to compare the acquired coordinate position of the pointing device with position of each of the hierarchically displayed folders of the hierarchical folder structure to determine whether the acquired coordinate position of the pointing device overlaps with any one of the hierarchically displayed folders of the hierarchical folder structure; and a folder information creation unit configured to create, if the determination unit determines that the acquired coordinate position of the pointing device overlaps with one of the hierarchically displayed folders and if the event type acquired by the second acquisition unit is determined to be a Drop, folder information about the one of the hierarchically displayed folders determined to be overlapping with the acquired coordinate position of the pointing device and set the created folder information into the web browser, and wherein the second extended program causes the computer to function as:

a third acquisition unit configured to acquire mouse event information relating to the display area defined on the web browser, based on a mouse event from an OS of the computer;

a first storage unit configured to store, into a bridge data storage unit, file information about the file that is being dragged when an event type included in the mouse event information acquired by the third acquisition unit is determined to be DragEnter representing that the pointing device dragging the file has entered into the display area defined on the web browser;

a second storage unit configured to store the mouse event information acquired by the third acquisition unit into the bridge data storage unit and notify the web browser that the mouse event information has been stored into the bridge data storage unit, wherein the stored mouse event information includes the information about the coordinate position of the pointing device in the display area and the information about the event type; and an upload unit configured to upload, when it is notified by the web browser that the folder information has been stored into the bridge data storage unit, a file that is managed by the OS and that is identified by the file information stored in the bridge data storage unit to a folder that is identified by the folder information stored in the bridge data storage unit and that is managed by the document management server, and wherein, the web browser executes the script program to perform:

acquiring, when notified by the second storage unit that the mouse event information has been stored, the mouse event information stored in the bridge data storage unit and setting the acquired mouse event information into the second acquisition unit, and wherein, the web browser executes the script program to further perform:

storing, when the folder information creation unit sets the created folder information into the web browser, the set folder information into the bridge data storage unit and notifying the upload unit that the folder information has been stored into the bridge data storage unit.

2. The storage medium according to claim 1, wherein the first extended program further causes the computer to function as a highlighting unit configured to highlight, if the determination unit determines that the acquired coordinate position of the pointing device overlaps with any one of the hierarchically displayed folders and if the event type acquired by the second acquisition unit is determined to be DragOver, the folder determined to be overlapping with the acquired coordinate position of the pointing device, among the hierarchically displayed folders of the hierarchical folder structure.

3. The storage medium according to claim 1, wherein the second extended program further causes the computer to function as:

an error notification unit configured to set, if an error is caused when the upload unit uploads the file, error information into the bridge data storage unit and notify the web browser that the error information has been set, wherein, when notified by the error notification unit of the error information, the web browser acquires the error information set in the bridge data storage unit and sets the acquired error information into the first extended program, and wherein the first extended program further causes the computer to function as:

an error display unit configured to display an error message, based on the error information set by the web browser.

4. The storage medium according to claim 1, wherein the display area includes a first area hierarchically displaying folders included in the hierarchical folder structure managed by the document management server and a second area displaying other information, and wherein the first extended program further causes the computer to function as an icon display unit configured to determine whether the position of the pointing device is in the first area, and display, if the pointing device is determined to be located in the first area based on the coordinate position of the pointing device acquired by the second acquisition unit, a first icon indicating that uploading is possible, and display, if the pointing device is determined to be located outside the first area, a second icon indicating that uploading is not possible.

5. The storage medium according to claim 1, wherein, if a plurality of files is being dragged, the first storage unit stores, into the bridge data storage unit, information about each of the plurality of files being dragged.

6. An information processing apparatus including a non-transitory computer-readable storage medium storing first and second extended programs to be executed on a web browser and a script program described in a predetermined script language, and a processor executing the web browser and the first and second extended programs, wherein the first extended program causes the processor to function as:

a first acquisition unit configured to acquire information about a hierarchical folder structure managed by a document management server, wherein the document management server is different from the information processing apparatus;

a display unit configured to hierarchically display, in a display area defined on the web browser according to descriptions of an HTML web page, folders of the hierarchical folder structure managed by the document management server, according to the information acquired by the first acquisition unit;

a second acquisition unit configured to acquire information about a coordinate position of a pointing device in the display area and information about an event type, from mouse event information set by the web browser;

a determination unit configured to compare the acquired coordinate position of the pointing device with position of each of the hierarchically displayed folders of the hierarchical folder structure to determine whether the acquired coordinate position of the pointing device overlaps with any one of the hierarchically displayed folders of the hierarchical folder structure; and a folder information creation unit configured to create, if the determination unit determines that the acquired coordinate position of the pointing device overlaps with one of the hierarchically displayed folders and if the event type acquired by the second acquisition unit is determined to be Drop, folder information about the one of the hierarchically displayed folders determined to be overlapping with the acquired coordinate position of the pointing device and set the created folder information into the web browser, and wherein the second extended program causes the processor to function as:

a third acquisition unit configured to acquire mouse event information relating to the display area defined on the web browser, based on a mouse event from an OS of the information processing apparatus;

a first storage unit configured to store, into a bridge data storage unit, information about the file that is being dragged when an event type included in the mouse event information acquired by the third acquisition unit is determined to be DragEnter representing that the pointing device dragging the file has entered into the display area defined on the web browser;

a second storage unit configured to store the mouse event information acquired by the third acquisition unit into the bridge data storage unit and notify the web browser that the mouse event information has been stored into the bridge data storage unit, wherein the stored mouse event information includes the information about the coordinate position of the pointing device in the display area and the information about the event type; and an upload unit configured to upload, when it is notified by the web browser that the folder information has been stored into the bridge data storage unit, a file that is managed by the OS and that is identified by the file information stored in the bridge data storage unit to a folder that is identified by the folder information stored in the bridge data storage unit and that is managed by the document management server, wherein, the web browser executes the script program to perform acquiring, when notified by the second storage unit that the mouse event information has been stored, the mouse event information stored in the bridge data storage unit and setting the acquired mouse event information into the second acquisition unit, and wherein, the web browser executes the script program to further perform storing, when the folder information creation unit sets the created folder information into the web browser, the set folder information into the bridge data storage unit and notifying the upload unit that the folder information has been stored into the bridge data storage unit.

7. The information processing apparatus according to claim 6, wherein the first extended program further causes the processor to function as a highlighting unit configured to highlight, if the determination unit determines that the acquired coordinate position of the pointing device overlaps with any one of the hierarchically displayed folders and if the event type acquired by the second acquisition unit is determined to be DragOver, the folder determined to be overlapping with the acquired coordinate position of the pointing device, among the hierarchically displayed folders of the hierarchical folder structure.

8. The information processing apparatus according to claim 6, wherein the second extended program further causes the processor to function as an error notification unit configured to set, if an error is caused when the upload unit uploads the file, error information into the bridge data storage unit and notify the web browser that the error information has been set, wherein, when notified by the error notification unit of the error information, the web browser acquires the error information set into the bridge data storage unit and sets the acquired error information in the first extended program, and wherein the first extended program further causes the processor to function as an error display unit configured to display an error message, based on the error information set by the web browser.

9. The information processing apparatus according to claim 6, wherein the display area includes a first area hierarchically displaying folders included in the hierarchical folder structure managed by the document management server and a second area displaying other information, wherein the first extended program further causes the processor to function as:

an icon display unit configured to determine whether the position of the pointing device is in the first area, and display, if the pointing device is determined to be located in the first area based on the coordinate position of the pointing device acquired by the second acquisition unit, a first icon indicating that uploading is possible and display, if the pointing device is determined to be located outside the first area, a second icon indicating that uploading is not possible.

10. The information processing apparatus according to claim 6, wherein, if a plurality of files is being dragged, the first storage unit stores, into the bridge data storage unit, information about each of the plurality of files being dragged.

* * * * *